US011334825B2

(12) United States Patent
Dhanabalan et al.

(10) Patent No.: US 11,334,825 B2
(45) Date of Patent: May 17, 2022

(54) IDENTIFYING AN APPLICATION FOR COMMUNICATING WITH ONE OR MORE INDIVIDUALS

(71) Applicant: Citrix Systems, Inc., Fort Lauderdale, FL (US)

(72) Inventors: Praveen Raja Dhanabalan, Bangalor (IN); Anuj Magazine, Bangalore (IN); Anudeep Athlur, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 28 days.

(21) Appl. No.: 16/879,246

(22) Filed: May 20, 2020

(65) Prior Publication Data

US 2021/0312366 A1  Oct. 7, 2021

(30) Foreign Application Priority Data

Apr. 1, 2020  (IN) .............................. 202011014521

(51) Int. Cl.
*G06Q 10/10* (2012.01)
*G06Q 10/06* (2012.01)
*H04L 12/18* (2006.01)
*G06F 21/62* (2013.01)

(52) U.S. Cl.
CPC ..... *G06Q 10/06314* (2013.01); *G06F 21/629* (2013.01); *G06Q 10/101* (2013.01); *G06Q 10/1095* (2013.01); *H04L 12/1818* (2013.01)

(58) Field of Classification Search
CPC ........... G06Q 10/06314; G06Q 10/101; G06Q 10/1095; G06F 21/629; H04L 12/1818

USPC ........................................................ 705/7.24
See application file for complete search history.

(56) References Cited

U.S. PATENT DOCUMENTS

| 7,707,249 | B2 * | 4/2010 | Spataro ................ H04L 65/403 |
| | | | 709/205 |
| 8,281,248 | B2 * | 10/2012 | Kurpick ................ G06Q 10/00 |
| | | | 715/755 |
| 9,729,649 | B1 * | 8/2017 | Beguin .................... H04L 51/04 |
| 10,318,034 | B1 * | 6/2019 | Hauenstein ........... G06F 3/0486 |

(Continued)

FOREIGN PATENT DOCUMENTS

WO  WO-2013104053 A1 * 7/2013 ........... G06F 3/0484

OTHER PUBLICATIONS

Tom "Enterprise Collaboration Management with Intraspect a Technical Overview White Paper", Jul. 2001, Intraspect Technical White Paper, pp. 1-24 (Year: 0720).*

(Continued)

*Primary Examiner* — Romain Jeanty
(74) *Attorney, Agent, or Firm* — Pierce Atwood LLP

(57) ABSTRACT

A method may involve receiving, by a computing system, an input indicative of an individual with whom a user of a client device is to communicate. The computing system may determine data of a plurality of applications, the data being indicative of the individual being available with at least one of the plurality of applications. The computing system may select, based at least in part on the data, a first application, from among the plurality of applications, for communication with the individual, and may cause the client device to output an indication that the first application can be used to communicate with the individual.

16 Claims, 15 Drawing Sheets

(56) References Cited

U.S. PATENT DOCUMENTS

| | | | |
|---|---|---|---|
| 2008/0091777 A1* | 4/2008 | Carlos | G06Q 10/10 |
| | | | 709/204 |
| 2008/0285729 A1* | 11/2008 | Glasgow | H04L 51/00 |
| | | | 379/88.13 |
| 2013/0326362 A1* | 12/2013 | Murray | G06Q 50/01 |
| | | | 715/750 |
| 2014/0007245 A1* | 1/2014 | Bank | G06F 21/6218 |
| | | | 726/26 |
| 2015/0150098 A1* | 5/2015 | Murphy | G16H 10/60 |
| | | | 726/4 |
| 2016/0191694 A1 | 6/2016 | Kim et al. | |
| 2018/0316635 A1* | 11/2018 | Chiu | H04L 67/306 |

OTHER PUBLICATIONS

International Search Report and Written Opinion issued in International Application No. PCT/US2021/020609, dated Jun. 11, 2021, 13 pages.

* cited by examiner

| User ID 1206 | Individual Status 1208 | Device Type 1210 | Meeting Flag 1212 1202 |
|---|---|---|---|
| 123 | Available | Desktop | False |
| 224 | Available | Mobile | True |
| 156 | Available | Laptop | False |
| 003 | Unavailable | Desktop | False |

| User ID 1214 | Application 1216 | App Status 1218 1204 |
|---|---|---|
| 123 | First App | Available |
| 123 | Second App | Unavailable |
| 123 | Third App | Available |
| 123 | Fourth App | Available |

| User ID 1302 | Application 1304 | Desktop Non-Meeting 1306 | Laptop Non-Meeting 1308 | Mobile Non-Meeting 1310 | Desktop Meeting 1318 | Laptop Meeting 1314 | Mobile Meeting 1316 1300 1320 |
|---|---|---|---|---|---|---|---|
| 123 | First App | 1 | 1 | 1 | 3 | 3 | 2 |
| 123 | Second App | 3 | 2 | 2 | 1 | 1 | 3 |
| 123 | Third App | 4 | 4 1322 | 3 | 2 | 2 | 1 1324 |
| 123 | Fourth App | 2 | 3 | 0 | 0 | 0 | 0 |

IDENTIFYING AN APPLICATION FOR COMMUNICATING WITH ONE OR MORE INDIVIDUALS

CROSS-REFERENCE TO RELATED APPLICATIONS

This application claims priority under 35 U.S.C. § 119(a) to Provisional Application No. 202011014521, entitled IDENTIFYING AN APPLICATION FOR COMMUNICATING WITH ONE OR MORE INDIVIDUALS, which was filed with the Indian Patent Office on Apr. 1, 2020, the entire contents of which are incorporated herein by reference for all purposes.

BACKGROUND

Various applications have been developed that allow users to collaborate electronically using computers, mobile devices, smartphones, tablets, etc. Examples of such collaboration applications include Slack, Outlook, Skype, GoToMeeting, Google Hangouts, Amazon Chime, etc. Many users, particularly in work environments, have several such applications available to them. Accordingly, such users typically develop preferences for certain collaboration applications based on their particular business needs, personality traits, etc.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, by a computing system, a first input indicative of a first individual with whom a user of a client device is to communicate; determining, by the computing system, first data of a plurality of applications, the first data being indicative of the first individual being available with at least one of the plurality of applications; selecting, by the computing system and based at least in part on the first data, a first application, from among the plurality of applications, for communication with the first individual; and causing the client device to output an indication that the first application can be used to communicate with the first individual.

In some disclosed embodiments, a method involves receiving, by a computing system, a first input indicative of a first individual with whom a user of a client device is to communicate; determining, by the computing system, first data indicating that the first individual prefers a first application over a second application; selecting, by the computing system and based at least in part on the first data, the first application for communication with the first individual; and causing the client device to output an indication that the first application can be used to communicate with the first individual.

In some disclosed embodiments, a computing system comprises at least one processor, and at least one computer-readable medium encoded with instructions which, when executed by the at least one processor, causes the computing system to receive a first input indicative of a first individual with whom a user of a client device is to communicate, to determine first data of a plurality of applications, the first data being indicative of the first individual being available with at least one of the plurality of applications, to select, based at least in part on the first data, a first application, from among the plurality of applications, for communication with the first individual, and to cause the client device to output an indication that the first application can be used to communicate with the first individual.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 12A is a table showing examples of status data values that may be associated with respective individuals who are registered with the system shown in FIG. 1;

FIG. 12B is a table showing examples of status data values that may be associated with collaborations applications that a given individual has access to via the system shown in FIG. 1; and FIG. 13 is a table showing examples of preference data values that may be associated with respective individuals who are registered with the system shown in FIG. 1.

DETAILED DESCRIPTION

For purposes of reading the description of the various embodiments below, the following descriptions of the sections of the specification and their respective contents may be helpful:

Section A provides an introduction to example embodiments of systems and methods for identifying an application for communicating with one or more individuals;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by clients to a variety of resources;

Section F provides a more detailed description of the example systems and methods that were introduced above in Section A; and Section G describes example implementations of methods, systems/devices, and computer-readable media in accordance with the present disclosure.

A. Introduction to Illustrative Embodiments of Systems and Methods for Identifying an Application for Communicating with One or More Individuals As noted above, it is common for individuals, particularly in work environments, to have a number of collaboration applications, e.g., Slack, Outlook, Skype, GoToMeeting, Google Hangouts, Amazon Chime, etc., available to them for communicating with others. The inventors have recognized and appreciated that selecting a suitable collaboration application for communicating with one or more particular individuals at a particular point in time can sometimes be difficult and/or time consuming. That is, a user who desires to communicate with another individual may not know or appreciate (A) which applications a device of the other individual is currently online with, (B) what type of device, e.g., desktop, laptop, or mobile, the other individual is currently operating, (C) whether the other individual is currently available to access an online application, (D) whether the other individual is in a meeting or is otherwise restricted in terms of the form of communication the user can engage in, e.g., audio versus non-audio communication, and/or (E) the other individual's preferences for certain collaboration applications over others. With existing systems, finding a suitable collaboration application oftentimes involves a lengthy trial-and-error process, in which a user needs to repeatedly guess at which collaboration might work for communicating with a particular individual (or group of individuals), until the user finally finds an application that will work in a particular situation. Such an approach can be both frustrating and time-consuming, and may cause friction among employees and/or result in a significant productivity loss for an organization.

Figure 1:
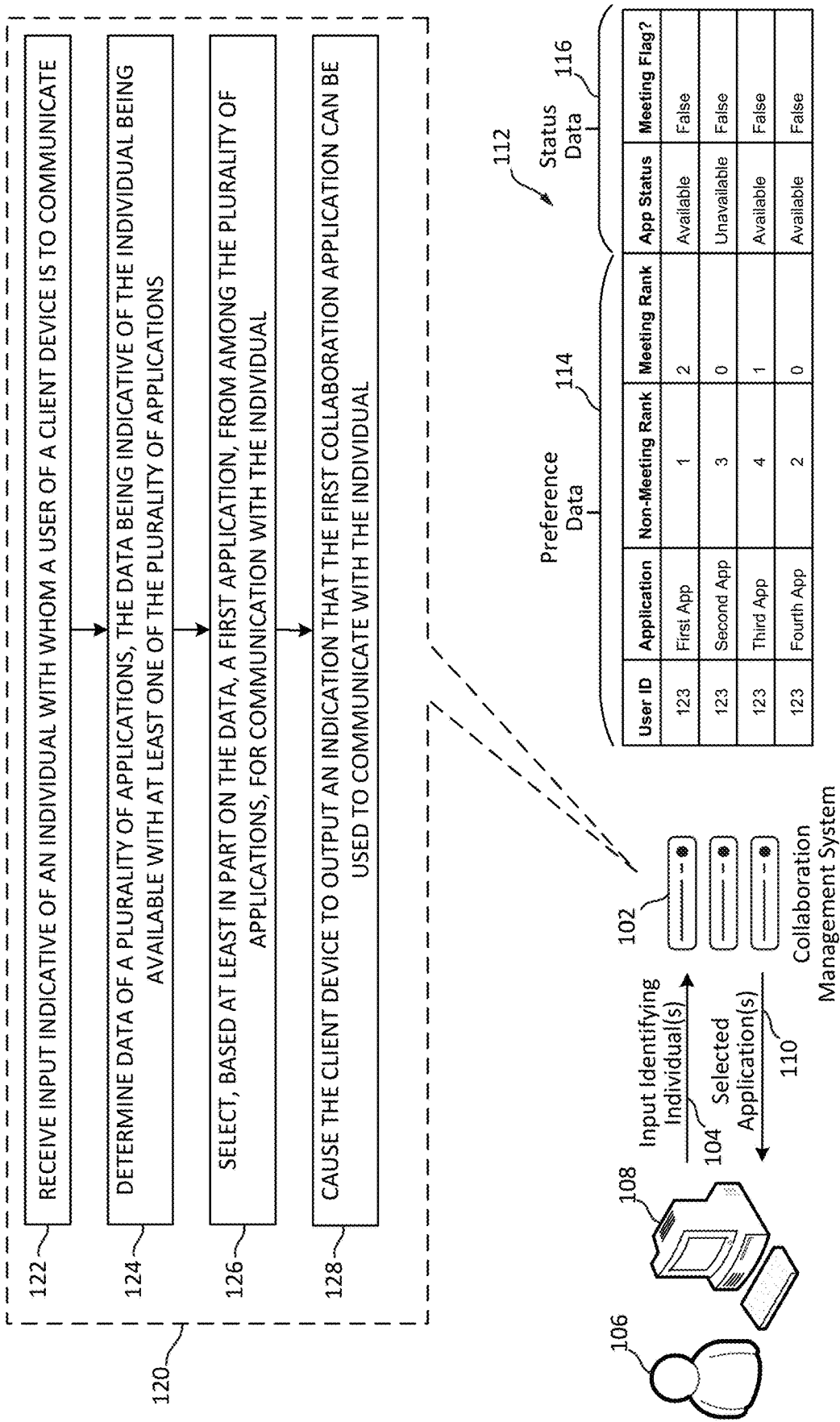
FIG. 1 is a high-level conceptual diagram showing an example implementation of a collaboration management system in accordance with some embodiments of the present disclosure.

Offered is a collaboration management system that can take some or all of the above-noted factors into account to seamlessly select at least one collaboration application for communicating with one or more particular individuals at a particular point in time. An example implementation of such a collaboration management system 102 is shown in FIG. 1. As shown, the collaboration management system 102 may receive an input 104 identifying one or more individuals with whom a user 106 of a client device 108 wishes to communicate, and the collaboration management system 102 may respond to the input 104 with an indication 110 of one or more particular collaboration applications that that system 102 has selected for use in communicating with the identified individual(s). As explained in more detail below, the collaboration management system 102 may evaluate a data set 112 to select at least one collaboration application for communicating with the identified individual(s) at the time the input 104 is received.

As shown, the data set 112 may include both preference data 114 and status data 116. As indicated, the preference data 114 and the status data 116 may be correlated with respective individuals, e.g., based on user identifiers ("user IDs"). The preference data 114 may identify various collaboration applications (e.g., "First App," "Second App," etc.) that are accessible to respective users, as well as preference rankings that indicate those users' preferences for certain collaborations applications over others. As illustrated, in some implementations, the preference data 114 may include one set of preference rankings (e.g., a "non-meeting rank") that indicates a ranking of the user's preferred collaboration applications when the user is not in a meeting, and another set of preference rankings (e.g., "meeting rank") that indicate a ranking of the user's preferred collaboration applications when the user is in a meeting. In some implementations, a rank value of "0" may indicate that the corresponding application is not to be used in the indicated circumstance, e.g., when the user is in a meeting, and lower, non-zero rank values may indicate more preferred applications. Accordingly, in the example shown in FIG. 1, the preference data 114 may indicate, for the individual corresponding to user ID "123," that (A) the "First App" (which has a "non-meeting rank" of "1") is the most preferred collaboration application when that individual is not in a meeting, (B) the "Third App" (which has a "meeting rank" of "1") is the most preferred collaboration application when that individual is in a meeting, and (C) the "Second App" and the "Fourth App" (which have "meeting rank" values of "0") are not to be used when that individual is in a meeting. The "Second App" and the "Fourth App" may, for example, be audio and/or video based collaboration applications that would not be appropriate for the individual to use when the individual is participating in a meeting with others. Although not shown in FIG. 1, it should be appreciated that the preference data 114 may further indicate other preferences of respective individuals. For example, as described below in Section F, in some implementations, the preference data may further indicate different preference rankings for particular device types, e.g., desktop, laptop, mobile, etc., in particular circumstances, e.g., in a meeting or not in a meeting. In some implementations, rankings indicated by the preference data 114 may be set by a system administrator and/or the respective individuals to whom such preferences apply. In other implementations, as explained in more detail below, preference rankings may additionally or alternatively be "learned" and/or adjusted based on the application usage history of respective individuals.

As shown in FIG. 1, the status data 116 may, for example, indicate whether the respective collaboration applications are currently available for use by particular individuals, e.g., when such individuals are currently online with the indicated applications, as well as whether the indicated individuals are currently in meetings, and thus may be restricted in terms of the modes of communication they can use to collaborate. Although not shown in FIG. 1, it should be appreciated that, in some implementations, the status data 116 may further indicate other status information corresponding to respective individuals. For example, as described below in Section F, in some implementations, the status data 116 may further indicate the particular types of devices, e.g., desktop, laptop, mobile, etc., respective individuals are using at the time an input 104 is received. A more detailed description of how the status data 116 and the preference data 114 may be used, together, to select one or more collaboration applications for use with particular individuals is provided below in Section F.

FIG. 1 shows an example routine 120 that the collaboration management system 102 may perform to identify an application (e.g., an optimal collaboration application) for communicating with one or more particular individuals based on the data set 112 in some implementations. As shown, the routine 120 may begin at a step 122, at which the collaboration management system 102 may receive an input 104 indicative of at least one individual with whom the user 106 desires to communicate. The input 104 may take on any of numerous forms and the collaboration management system 102 may be embodied in any of a number of ways. In some implementations, for example, the collaboration management system 102 may be embodied, in whole or in part, by a computing system that is remote from the client device 108, and the input 104 may correspond to a message that is sent from the client device 108 to such a remote computing system over a network. In such implementations, the remote computing system may execute some or all of the steps of the routine 120. In other implementations, the collaboration management system 102 may be embodied, in whole or in part, by the client device 108, and the input 104 may correspond to a command provided to the client device 108. In such implementations, the client device 108 may execute some or all of the steps of the routine 120.

At a step 124, the collaboration management system 102, wherever it happens to be implemented, may determine data of a plurality of applications, e.g., two or more applications that are accessible by the individual indicated by the input 104 received at the step 122. As indicated by the text of the step 124, the determined data may be indicative of the individual being available with at least one of the plurality of applications. The determined data may, for example, correspond to one or both of the "app status" and "meeting flag" entries for the "first app" shown in FIG. 1.

The status data 116 for respective applications may be determined in any of a number of ways and/or circumstances, and may come from any of a number of sources. In some implementations, for example, the collaboration management system 102 may possess access credentials for the individuals using the system 102 that allow the system 102 to query the respective collaboration applications for certain status information concerning the use of those applications by such individuals. The collaboration management system 102 may, for example, use such access credentials to make application programming interface (API) calls to such applications to determine status information, such as whether the individual is currently on line with the application, whether the application indicates the individual is "away," whether the application indicates the individual is in a meeting, whether the application indicates the individual is operating a particular type of device, etc. As explained in more detail below, in some implementations, access credentials maintained by a single sign-on service or similar mechanism may be used by the collaboration management system 102 to acquire status information from the respective collaboration applications. An example of such a single sign-on service is described below in connection with the multi-resource access system shown in FIG. 5A-D.

In some implementations, the collaboration management system 102 may be included within, or in conjunction with, a multi-resource access system, such as that described below in connection with FIGS. 5A-D. As explained below, such a multi-resource access system may maintain "status" records indicating which resources particular individuals are currently accessing, the types of devices that are being used by such individuals, etc. In some implementations, such records may additionally or alternatively be referenced to determine some or all the status data 116 based, for example, on whether such records indicate particular individuals are currently online with particular collaboration applications, whether such records indicate particular individuals are currently using particular types of devices to access such applications, etc.

In some implementations, some or all of the status data 116 may be acquired periodically from the respective collaboration applications and/or status records of a multi-resource access system, and stored in a database or other repository for subsequent reference by a component that can then select a collaboration based on such data. In other implementations, some or all of the status data 116 may be retrieved from such source(s) on demand, e.g., in response to receipt of respective inputs 104.

As shown in FIG. 1, at a step 126 of the example routine 120, the collaboration management system 102 may select, based at least in part on the data determined at the step 124, a first application, from among the plurality of applications, for communication with the individual(s) indicated by the input 104 received at the step 122.

At a step 128 of the routine 120, the collaboration management system 102 may cause the client device 108 to output an indication that the selected collaboration application(s), e.g., the first collaboration application, can be used to communicate with the identified individual(s). As explained in more detail below, in some implementations, the collaboration management system 102 may cause the client device 108 to present one or more user interface elements that can be selected by the user 106 to cause the selected collaboration application(s) to be launched for the user 106 and/or to initiate collaboration session(s) with the identified individual(s) using the selected collaboration application(s).

Additional details and example implementations of embodiments of the present disclosure are set forth below in Section F, following a description of example systems and network environments in which such embodiments may be deployed.

B. Network Environment

Figure 2:
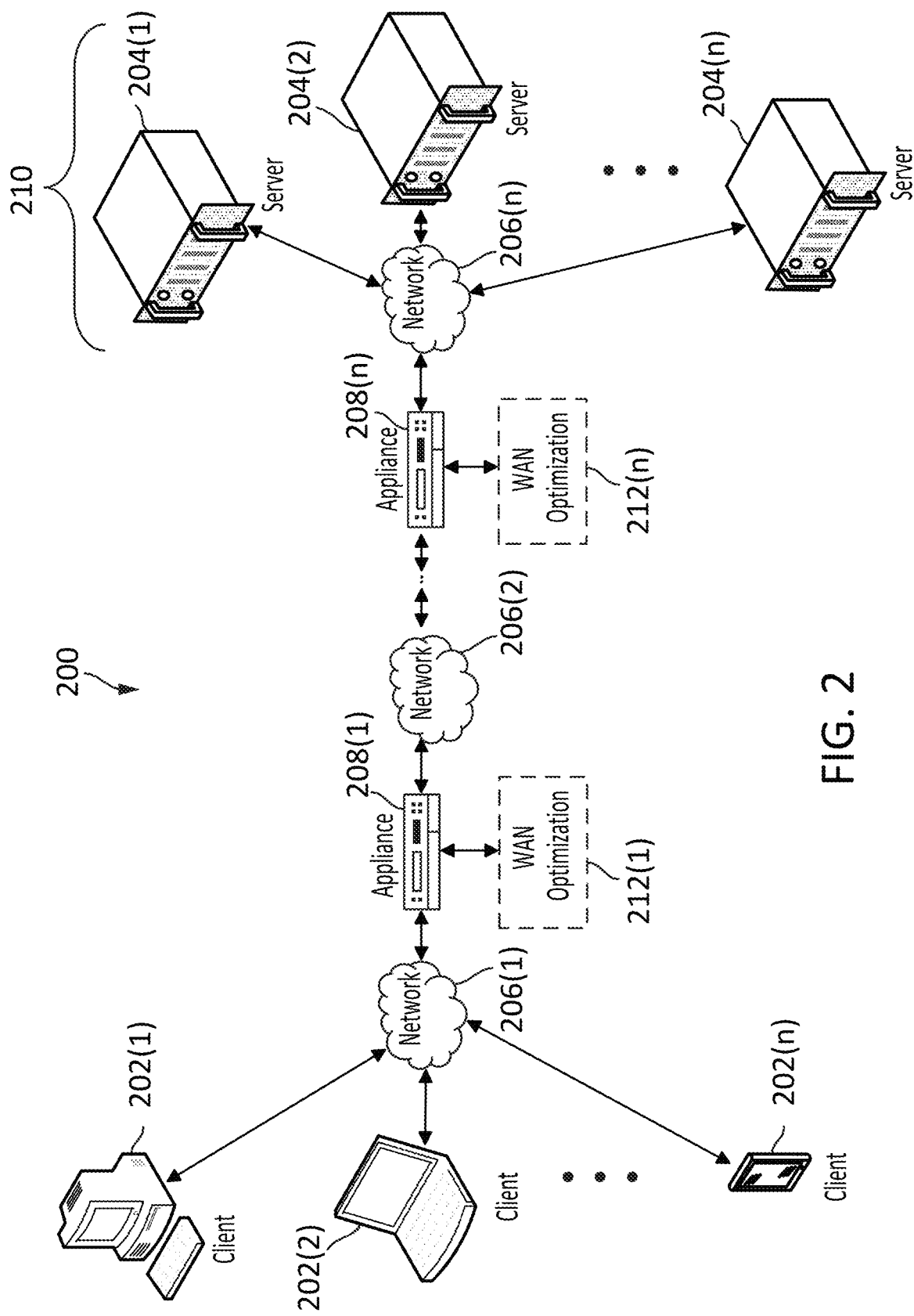
FIG. 2 is a diagram of a network environment in which some embodiments of the message exchange system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
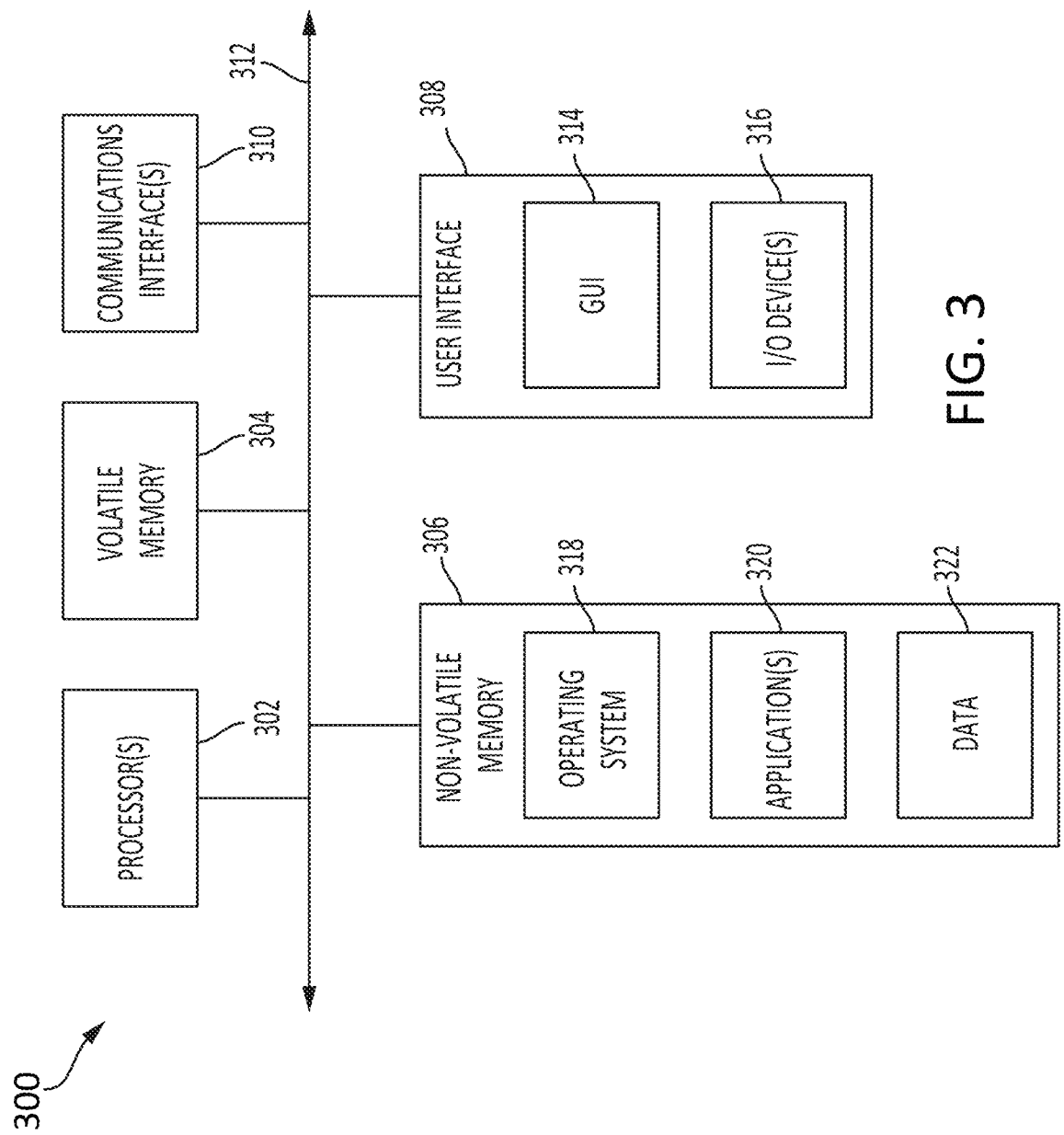
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
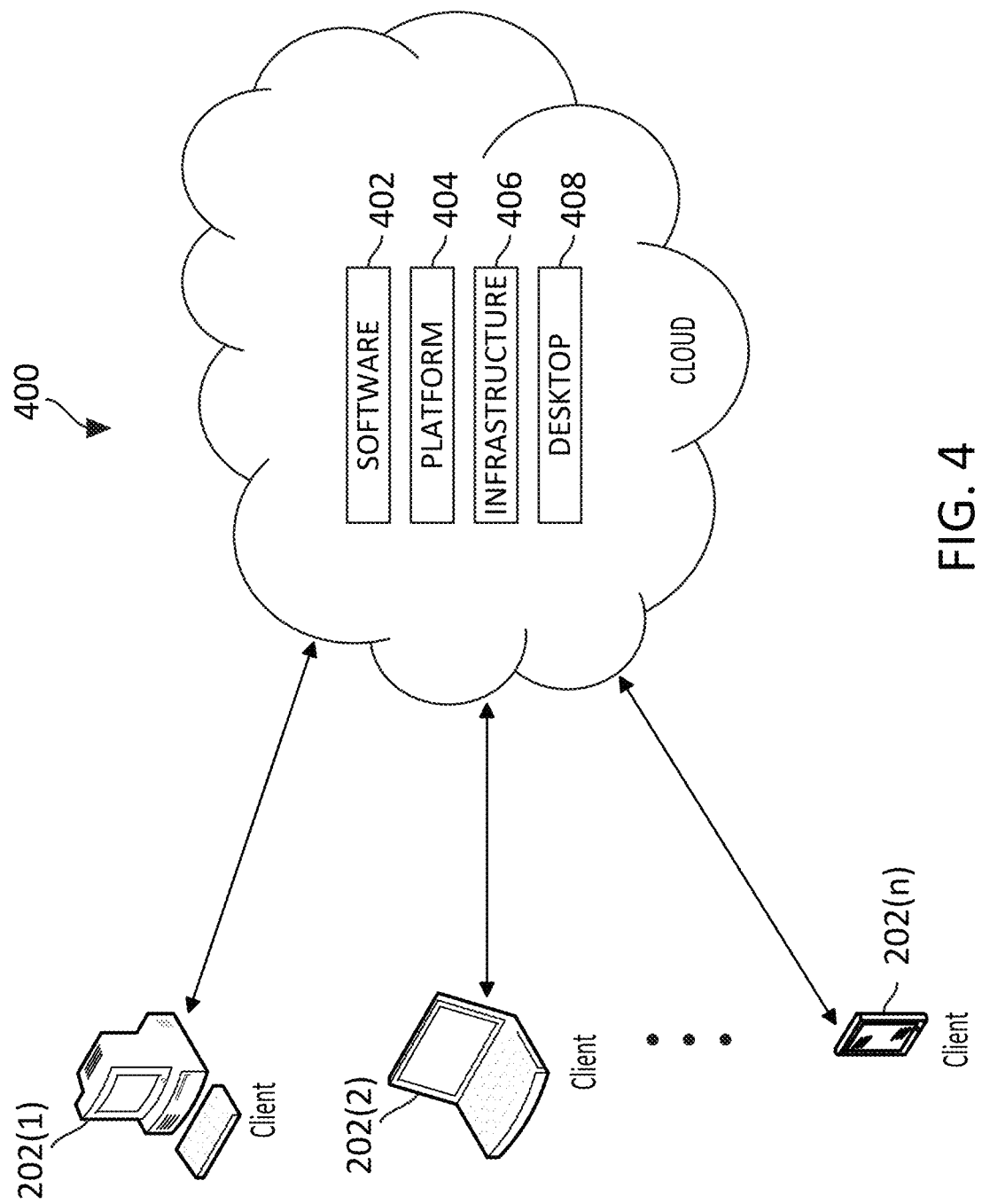
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile® from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 5A:
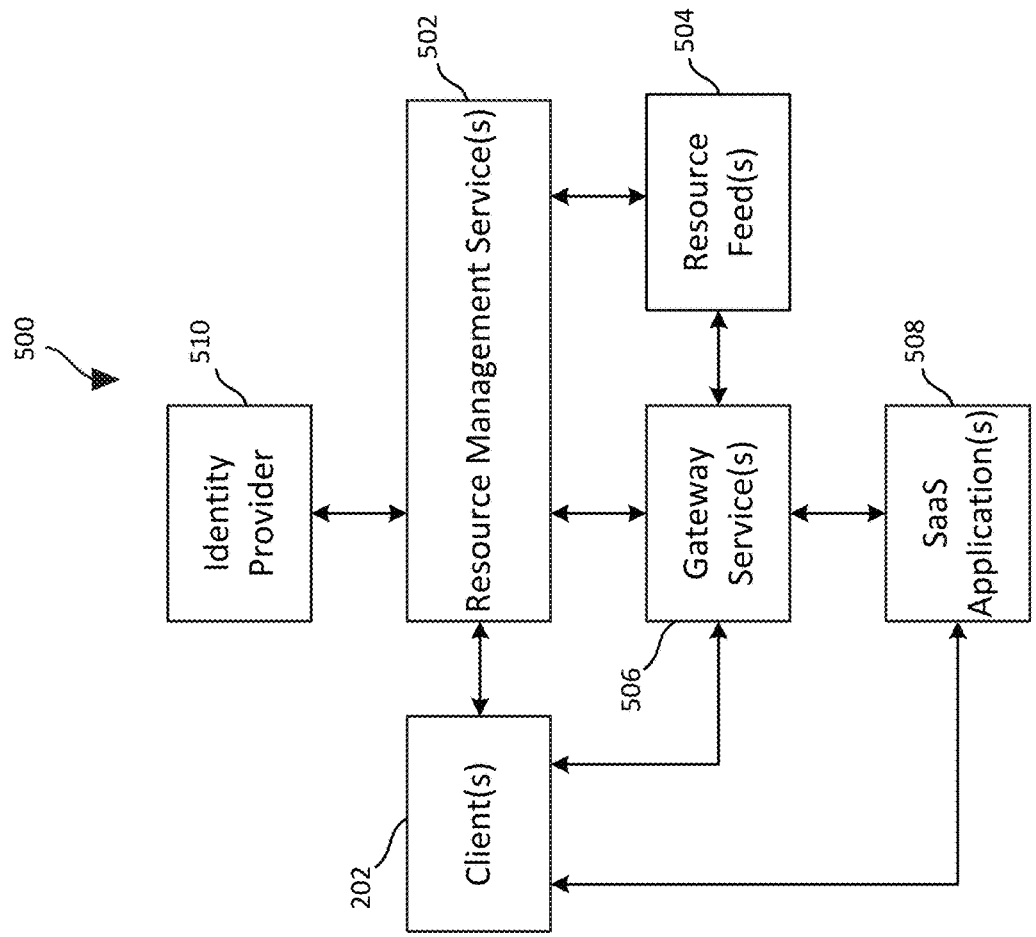
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
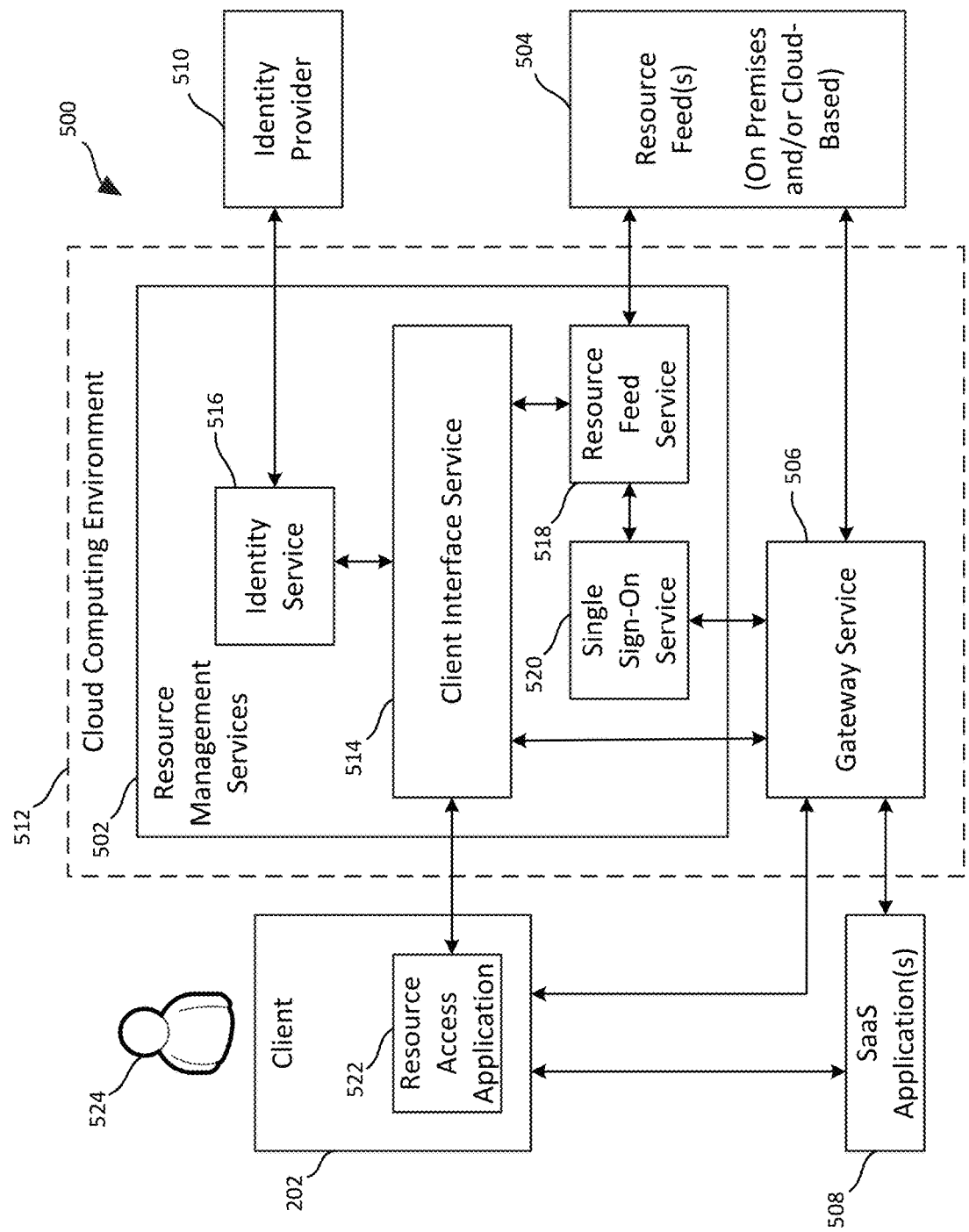
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., ShareFile®), one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
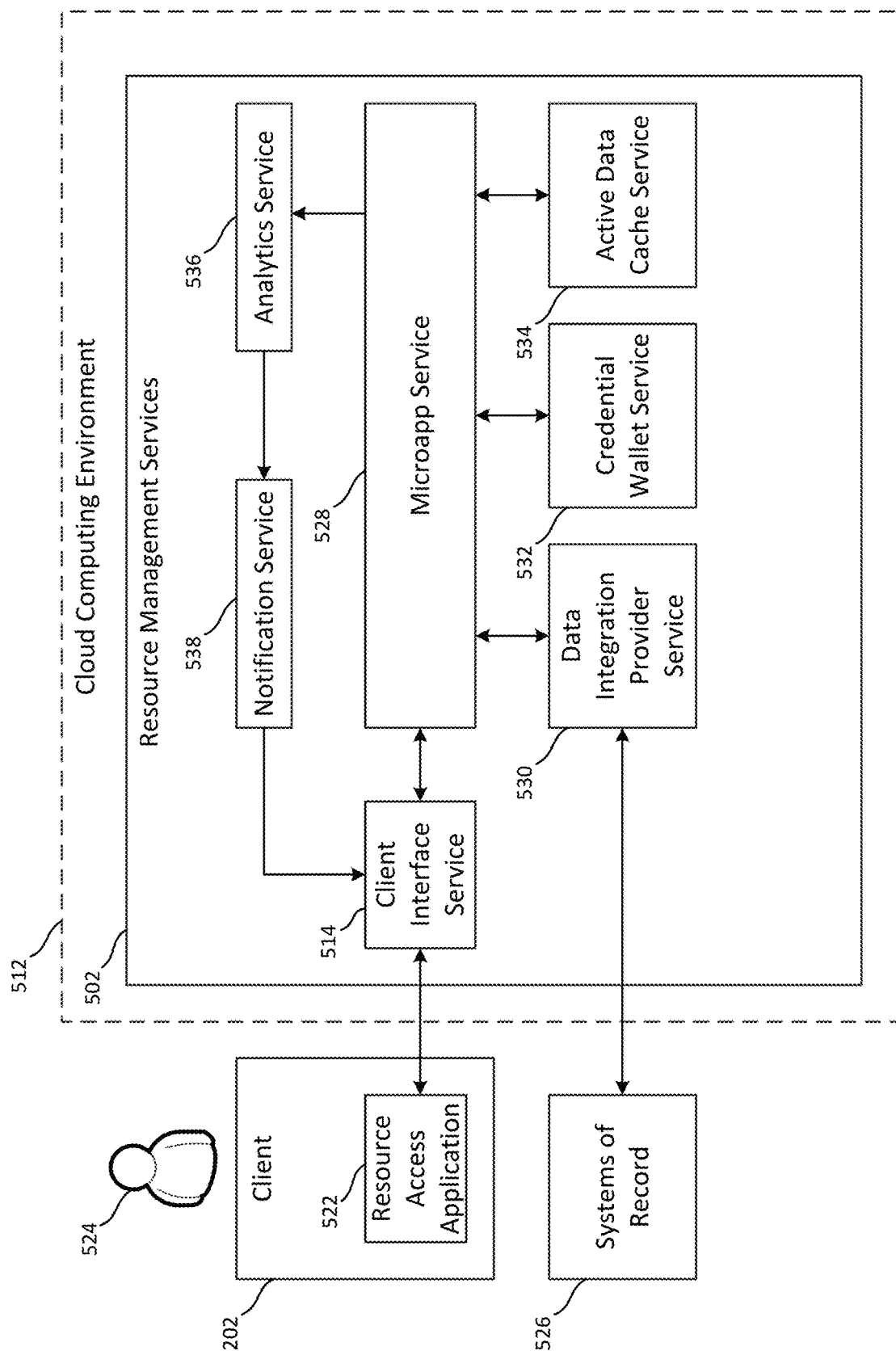
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
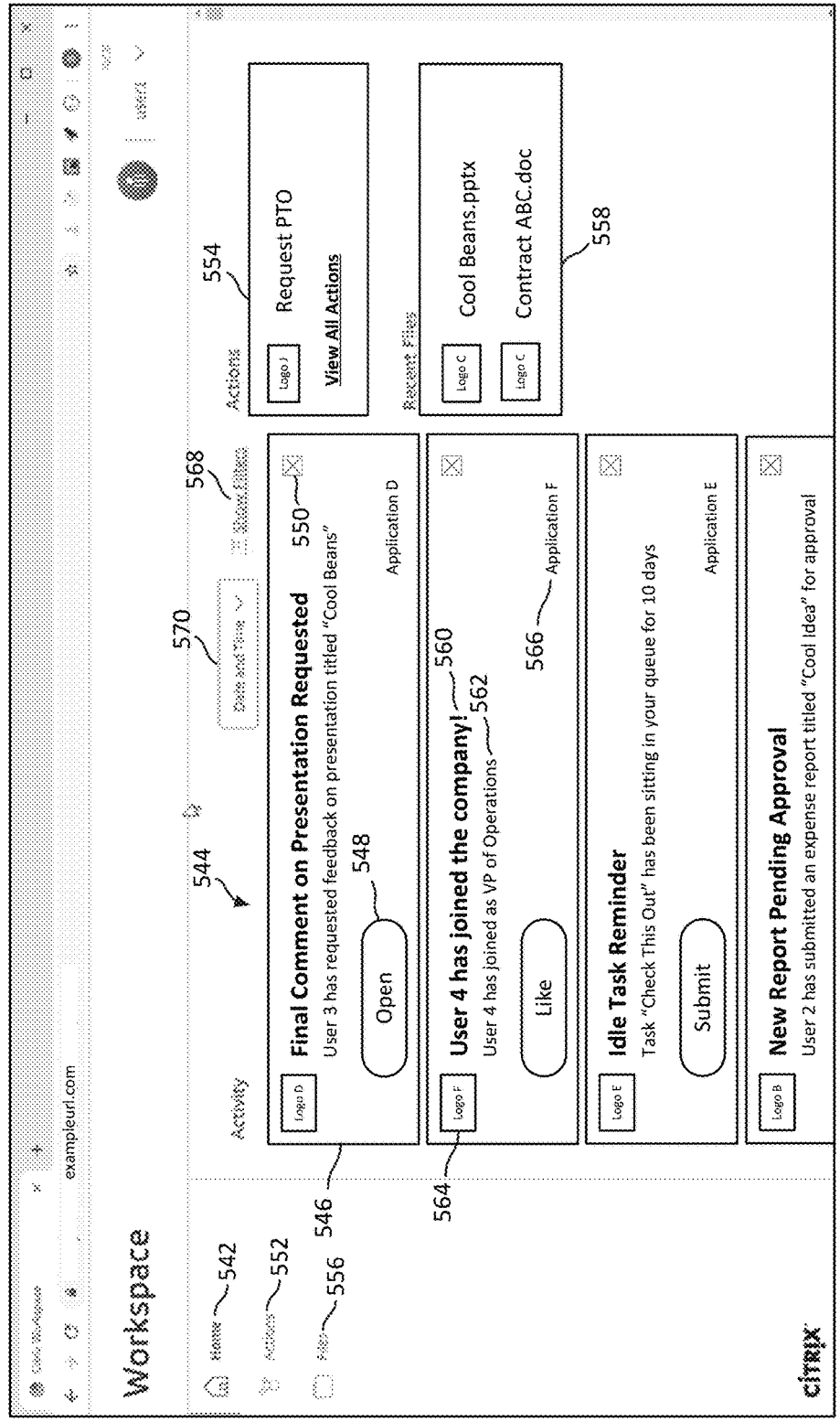
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one of more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D) and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile® platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

Figure 6:
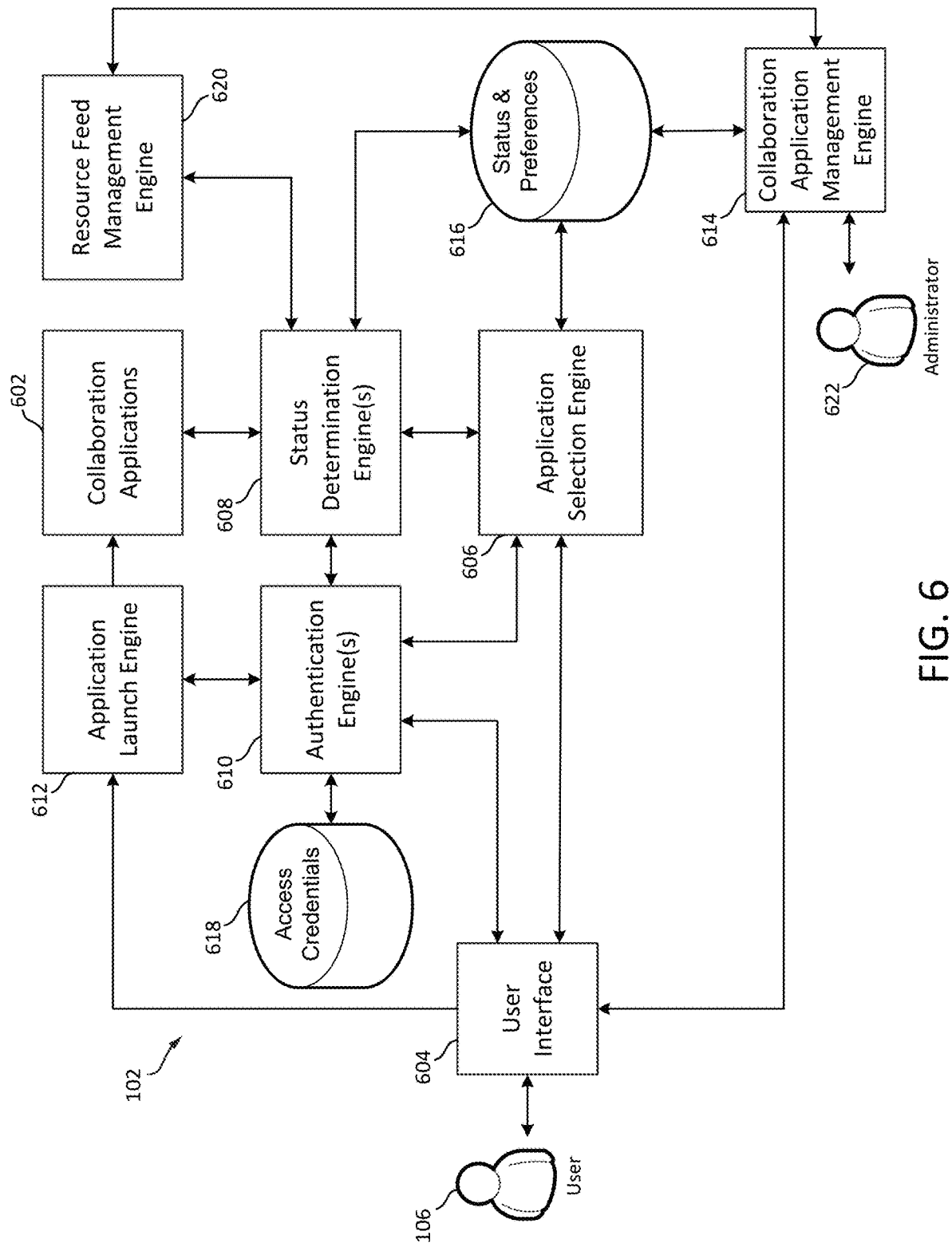
FIG. 6 is a block diagram illustrating example components that may be used to implement the collaboration management system shown in FIG. 1.

F. Detailed Description of Example Embodiments of Systems and Methods for Identifying an Application for Communicating with One or More Individuals FIG. 6 is a block diagram showing various components of an example embodiment of the collaboration management system 102 that was introduced above in connection with FIG. 1. As shown, in addition to various collaboration applications 602, such as Slack, Outlook, Skype, GoToMeeting, Google Hangouts, Amazon Chime, etc., that are accessible to the user 106 as well as other individuals, the collaboration management system 102 may, in some implementations, include a user interface 604, an application selection engine 606, one or more status determination engines 608, one or more authentication engines 610, an application launch engine 612, a collaboration application management engine 614, one or more databases 616, 618, and a resource feed management engine 620. As indicated, the database(s) 616 may store some or all of the preference data 114 and the status data 116 that was discussed above in connection with FIG. 1. Although not shown in FIG. 6, it should be appreciated that other individuals may likewise have access to the collaboration applications 602, and that the system 102 may further be configured to enable access to functionality for such individuals that is similar to the functionality that can be provided to the user 106 as described herein.

In some implementations, the collaboration management system 102 may be included within, or operate in conjunction with, a multi-resource access system, such as the multi-resource access system 500 described above in connection with FIGS. 5A-D. In such an implementation, the collaboration applications 602 may, for example, be included among the resources that are managed by the resource feed service 518 shown in FIG. 5B. In some embodiments, the resource feed management engine 620 shown in FIG. 6 may correspond to the resource feed service 518. As such, following authentication of the user 106, 524 by the identity service 516 and/or the identity provider 510, as described above in connection with FIG. 5B, the single sign-on service 520 may seamlessly authenticate the user 106, 524 to the respective collaboration applications 602, as well as other managed resources, e.g., when the user 106, 524 selects such a resource via the resource access application 522. In such implementations, the authentication engine(s) 610 shown in FIG. 6 may correspond to one or more of the identity service 516, the identity provider 510, and the single sign-on service 520 shown in FIG. 5B, and the database(s) 618 may correspond to the repositories in which the credentials of the user 106, 524, as well as other individuals, are stored for use by those components.

In some implementations, the status determination engine(s) 608 may gather some or all of the status data 116 from the collaboration applications 602 on a periodic basis, and may store such gathered status data 116 in the database(s) 616 for subsequent use by the application selection engine 606. For example, in response to an input 104 from the user 106 seeking identification of at least one application (e.g., an optimal collaboration application) for communicating with one or more particular individuals, the application selection engine 606 may use the status data 116 in the database(s) 616 to select one or more of the collaboration applications 602 for that purpose. In other implementations, the status determination engine(s) 608 may gather information from the collaborations applications 602 on demand, e.g., in response to user inputs 104 seeking identification of applications for communicating with one or more particular individuals. In such implementations, the status determination engine(s) 608 may store the gathered status data in the database(s) 616 for subsequent access by the application selection engine 606 and/or may simply pass the gathered status data directly to the application selection engine 606 for use in selecting one or more collaboration applications 602 in response to the input 104.

In addition to or in lieu of obtaining some or all of the status data 116 from the collaboration applications 602, in some implementations, the status determination engine(s) 608 may access records from other sources that indicate the status of certain individuals and/or client devices 108, 202 with respect to the collaboration applications 602. Such records may, for example, be accessed from the resource feed management engine 620 shown in FIG. 6. As noted above, in some implementations, the resource feed management engine 620 may correspond to the resource feed service 518 shown in FIG. 5B. In such implementations, the status determination engine(s) 608 may thus additionally or alternatively obtain some or all of the status data 116 from the resource feed management engine 620.

In some implementations, the database(s) 618, which may be accessed via the authentication engine(s) 610, may store access credentials for the user 106 and/or for other individuals with whom the user 106 may want to communicate using a selected one of the collaboration applications 602. For example, in implementations in which the collaboration management system 102 operates within or in conjunction with the multi-resource access system 500 described above in connection with FIGS. 5A-D, the authentication engine(s) 610 may correspond, at least in part, to the single sign-on service 520 (shown in FIG. 5B), and the database(s) 618 may correspond, at least in part, to the access credential repository that is used by that service. The access credentials for the user 106 may, for example, be used to authenticate the user 106 to the application selection engine 606, the status determination engine(s) 608, the collaboration application management engine 614, and/or a selected collaboration application 602 (via the application launch engine 612), e.g., following authentication of the user 106, 524 by an identity provider 510 so as to enable use of the single-sign on service 520. In some implementations, the authentication engine(s) 610 may additionally or alternatively correspond, at least in part, to the identity service 516 and/or the identity provider 510 shown in FIG. 5B, and the database(s) 618 may correspond, at least in part, to an access credential repository used by such service(s).

The status determination engine(s) 608 may similarly obtain access credentials for the other individuals from the database(s) 618 (via the authentication engine(s) 610) and use such access credentials to authenticate the other individuals to the respective collaboration applications 602 to obtain pertinent status data from those applications, e.g., using application programming interface (API) calls to such applications.

In some implementations, following selection of one or more collaboration applications 602 by the application selection engine 606, the application selection engine 606 may send instructions to the user interface 604 that cause the user interface 604 to present one or more user interface elements, e.g., buttons, links, etc., that the user 106 can select to launch the selected application(s) and/or initiate one or more collaboration sessions with the individual(s) specified in the input 104 using the selected application(s). In such implementations, selection of such a user interface element may, for example, trigger the application launch engine 612 to obtain the user's access credentials for the corresponding collaboration application 602 from the database(s) 618 (via an authentication engine 610), and use those access credentials to launch that application and/or initiate a collaboration session with the indicated individual(s), e.g., using an API of the selected collaboration application 602.

The status determination engine(s) 608 may take on any of numerous forms and may be disposed in any of a number of locations. In some implementations, for example, the status determination engine(s) 608 may include a first component (a "status sender") of the application selection engine 606 and a second component (a "status collector") that is remotely located, e.g., within a cloud computing environment, together with the database(s) 616. For example, in some implementations, whenever the user 106, 524 or any other individual first authenticates to a multi-resource access system, such as the multi-resource access system 500 described above in connection with FIGS. 5A-D, a respective application that includes a "status sender" component of the status determination engine(s) 608 may be launched automatically for that user/individual. In some implementations, the single sign-on service 520 may use stored access credentials of the user 106, 524 and the other individuals to launch such applications. Once that application has been launched, the status sender component may query the collaboration applications 602, either periodically or on demand, for some or all of the status data 116 and may send the acquired status data 116 to the status receiver component of the status determination engine(s) 608. The status receiver component in such implementations may thus receive and store status data 116, e.g., in the database(s) 616, from the various individuals who are using the multi-resource access system 500.

The application selection engine 606 shown in FIG. 6 may likewise take on any of numerous forms and may be disposed in any of a number of locations. In some implementations, the application selection engine 606 may be a part of the same application as a "sender component" of the status determination engine(s) 608, and may thus be launched together with such a component. In other implementations, the application selection engine 606 may be included in a separate application, and may be launched separately from such a sender component. For example, in some implementations, the application selection engine 606 may be one of the resources that is managed by resource feed management engine 620 (e.g., the resource feed service 518 shown in FIG. 5B) and can thus be selected by a user 106, 524 who is interacting with an instance of the resource access application 522 described above in connection with FIGS. 5A-D. In some implementations, the user interface 604 may present the user 106, 524 with a tool for inputting or selecting the names of one or more individuals with whom the user 106, 524 wishes to communicate. Such a tool may, for example, be presented as an input field within screen presented by the resource access application 522, such as the screen 540 shown in FIG. 5D. Alternatively, such a tool may be presented as a component of a separate application that is launched in response to a prompt by the user 106, 524, as an input to the resource access application 522 or otherwise.

In some implementations, the application selection engine 606 may be embodied within an application that is provided as one of the resource feeds 504 or SaaS applications 508 shown in FIG. 5B. In other implementations, the application selection engine 606 may be embodied within an application that is local on the client device 108, 202 operated by the user 106, 524. In still other implementations, the application selection engine 606 may be embodied within a microapp or other application provided by the resource management services 502 shown in FIGS. 5A-C. It is important only that the user interface 604 somehow be able to interface with the application selection engine 606, and that the application selection engine 606 somehow be able to access some or all of the preference data 114 and/or the status data 116 so as to be able to use that data to select one or more of the collaboration applications 602. In some implementations, the preference data 114 and/or the status data 116 may be stored within a cloud-based computing environment or by some other resource that can be accessed by other devices via the Internet or other network. Accordingly, the application implementing the functionality of the application selection engine 606 described herein may reside practically anywhere.

As shown in FIG. 6, the collaboration application management engine 614 may allow a system administrator 622, the user 106, 524 (e.g., via the user interface 604), or other individual, to set and/or adjust some or all of the preference data 114. Further, in some implementations, the collaboration application management engine 614 may additionally or alternatively monitor patterns of usage of the collaboration applications 602 by respective individuals, e.g., based on activity of the resource feed management engine 620 (e.g., the resource feed service 518 shown in FIG. 5B) or otherwise, to automatically set or adjust such individuals' preference ranking values for the respective collaboration applications 602.

Figure 7:
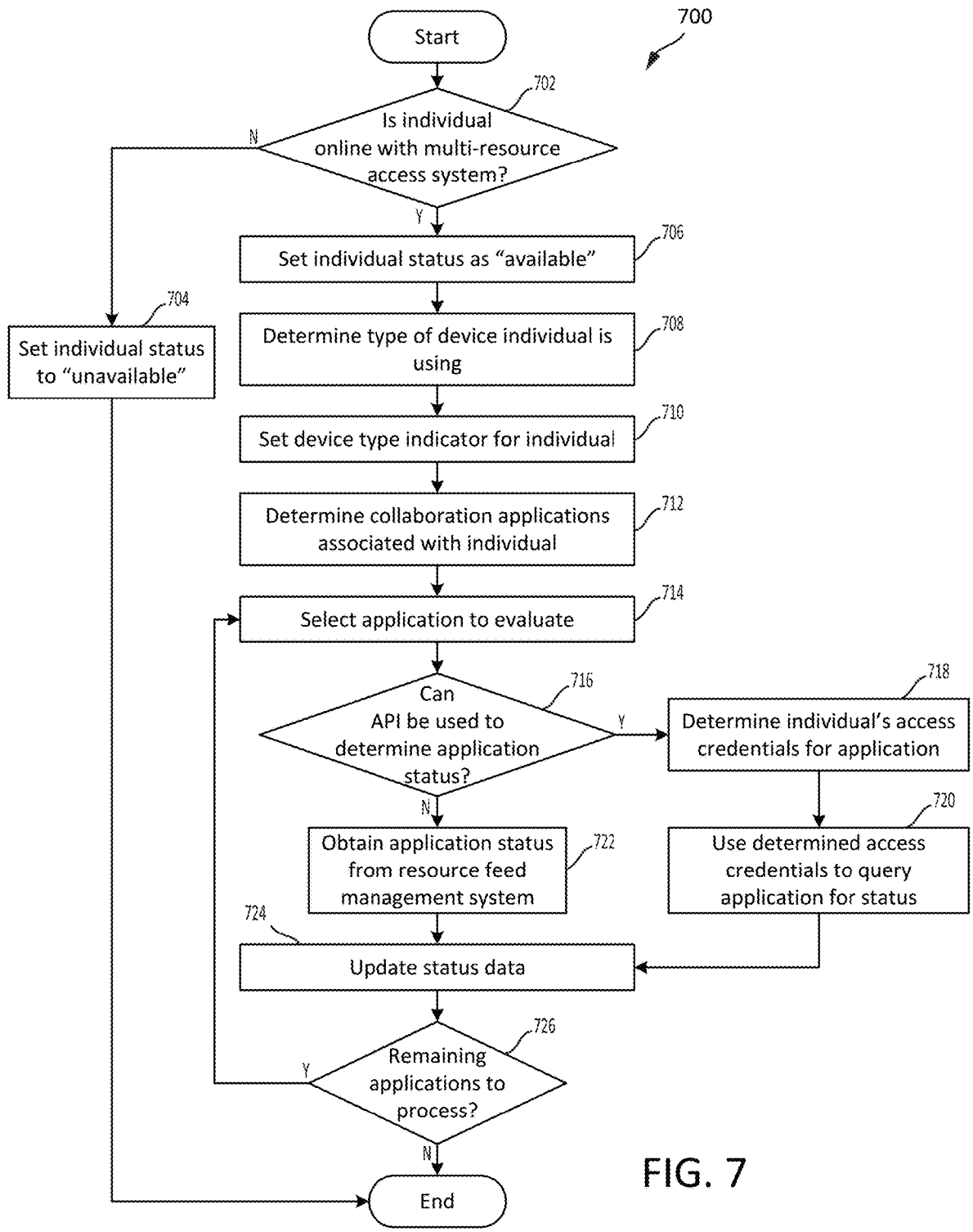
FIG. 7 is a flow chart showing an example routine that may be executed by the status determination engine shown in FIG. 6.
Figure 8:
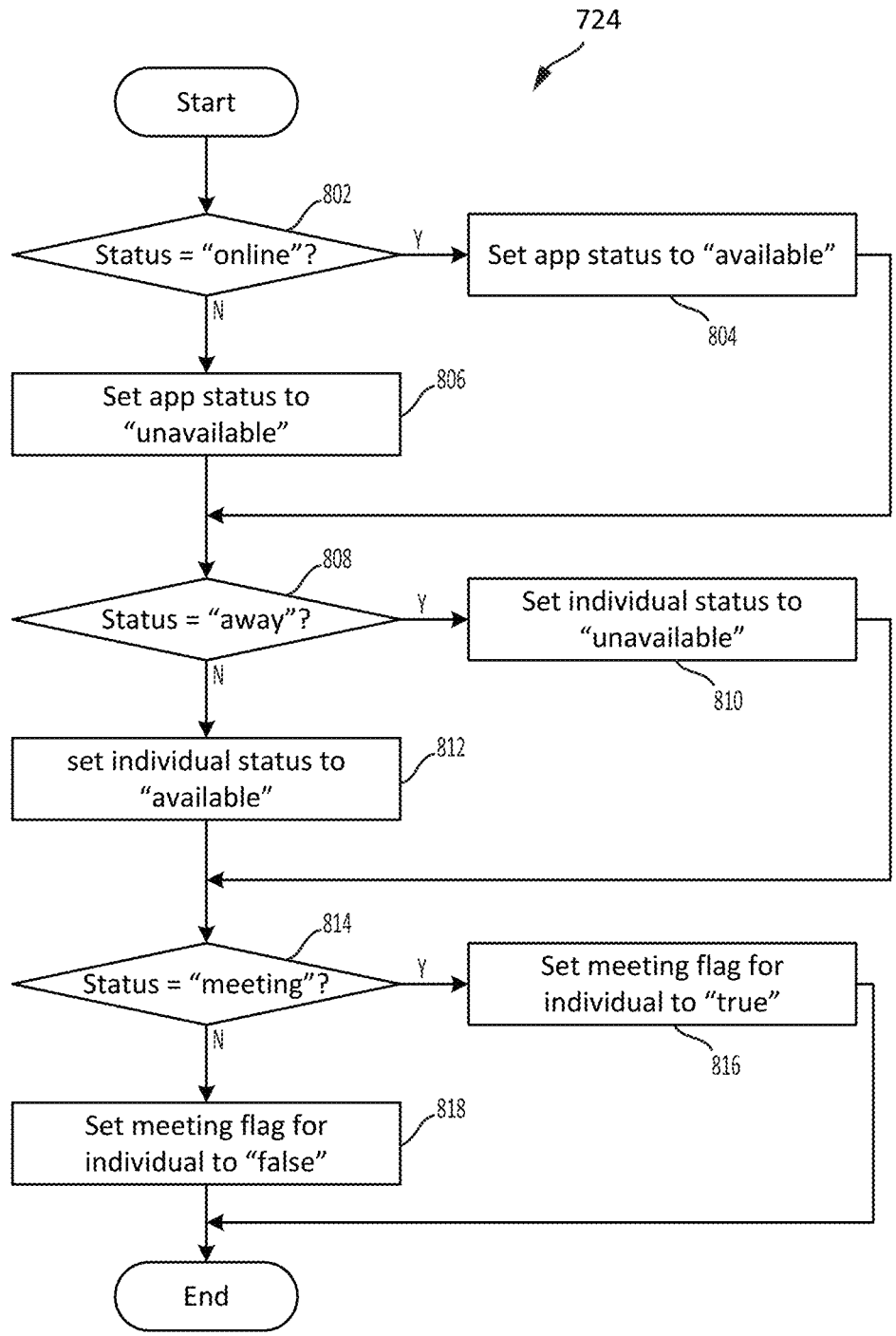
FIG. 8 is a flow chart showing an example implementation of the "update status data" step shown in FIG. 7.
Figure 9:
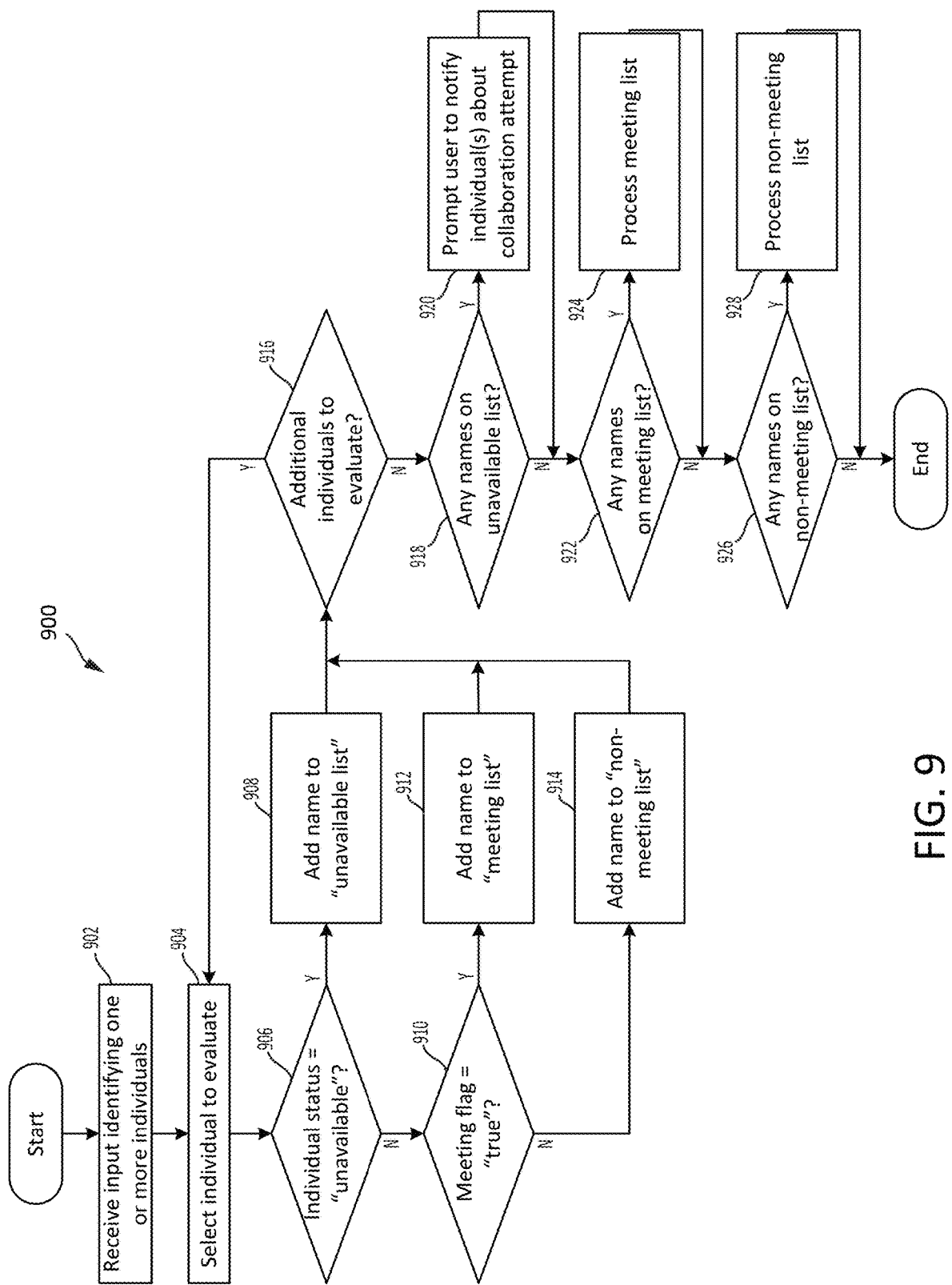
FIG. 9 is a flow chart showing an example routine that may be executed by the application selection engine shown in FIG. 6.
Figure 10:
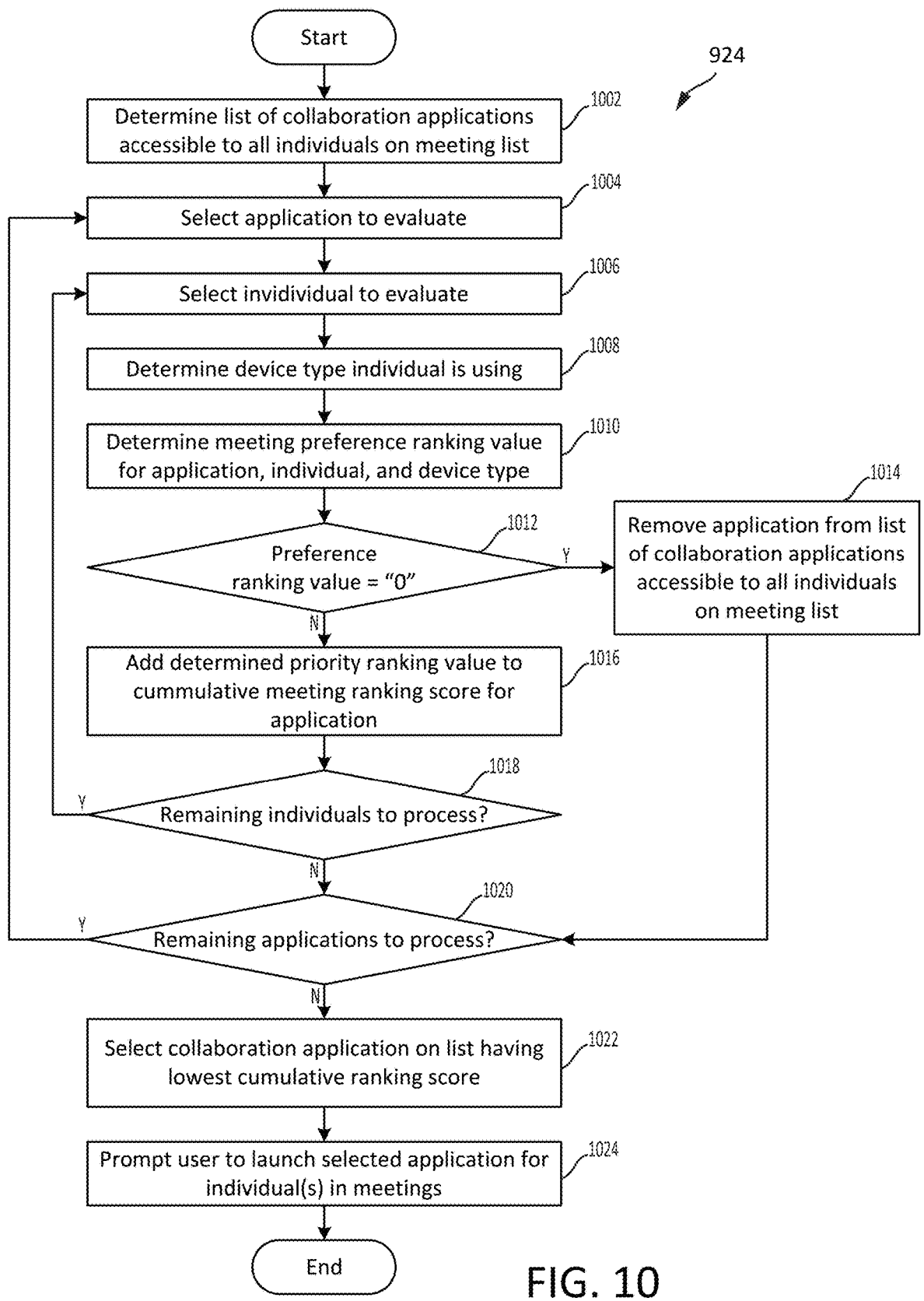
FIG. 10 is a flow chart showing an example implementation of the "process meeting list" step shown in FIG. 9.
Figure 11:
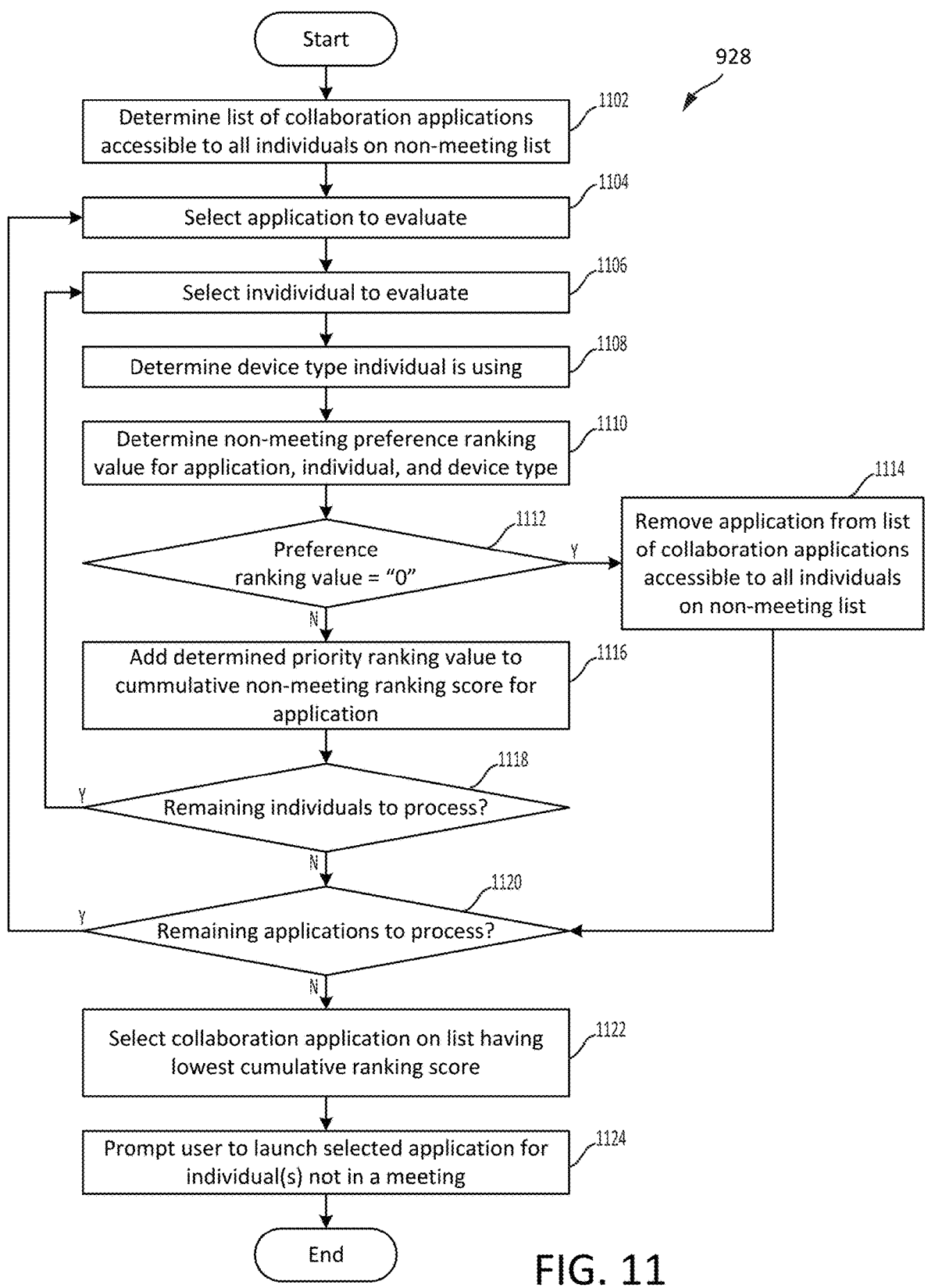
FIG. 11 is a flow chart showing an example implementation of the "process non-meeting list" step shown in FIG. 9.

FIG. 7 is a flowchart showing an example routine 700 that may be executed by the status determination engine(s) 608 shown in FIG. 6. FIG. 8 is a flowchart showing an example implementation of the step 724 shown in FIG. 7. FIG. 9 is a flowchart showing an example routine 900 that may be executed by the application selection engine 606 shown in FIG. 6. FIG. 10 is a flowchart showing an example implementation of the step 924 shown in FIG. 9. FIG. 11 is a flowchart showing an example implementation of the step 928 shown in FIG. 9. In some implementations, the routines 700 and 900, as well as some or all of the other functionality described herein, may be executed by one or more processors in accordance with instructions stored in one or more computer-readable media. The computing system(s) that implement such functionality may take on any of numerous forms. Such computing system(s) may, for example, be configured like the example computing system 300 described above in connection with FIG. 3, and/or may correspond to one or more of the clients 202, servers, 204, appliances 208, or cloud-based computing components described above.

Referring to FIG. 7, the routine 700 may be performed by the status determination engine(s) 608 periodically for individuals who are registered with the system 102, and/or on demand for individuals who are identified in an input 104. As explained below, the routine 700 results in the determination of some or all of the status data 116 for a particular individual. As noted above, the determined status data 116 may be written to the database(s) 616 for subsequent access by the application selection engine 606 and/or may be provided directly to the application selection engine 606, e.g., in connection with an on-demand implementation.

Tables 1202 and 1204 shown in FIGS. 12A and 12B, respectively, show examples of values of the status data 116 that may be determined pursuant to the routine 700. In particular, the table 1202 shows examples of status data values of respective individuals who are registered with the system 102, and the table 1204 shows examples of status data values of collaboration applications for a given individual (user ID "123" in the illustrated example) with access to the system 102. As shown in FIG. 12A, individuals (corresponding to a unique user ID entry 1206) registered with the system 102, the table 1202 may include (A) an entry 1208 indicating whether the individual is currently "available" or "unavailable," (B) an entry 1210 indicating the type of device (e.g., desktop, laptop, or mobile) the individual is currently using to access the system 102, and (C) an entry 1212 indicating whether the individual is currently in a meeting. As shown in FIG. 12B, for collaboration applications (e.g., as indicated by a unique application name entry 1216) for a particular individual (per a user ID entry 1214), the table 1204 may include an entry 1218 indicating whether the application is currently "available" or "unavailable" for use by the individual. As explained below, in some implementations, a collaboration application may be deemed "available" for use by an individual when at least one device operated by the individual is online with the application, and may be deemed "unavailable" for use by the individual when no device operated by the individual is online with it. The manner in which the various values in the tables 1202 and 1204 may be set and/or changed by the status determination engine(s) 608, in accordance with some embodiments, in described below in connection with the routine 700 shown in FIG. 7. The manner in which the application selection engine 606 may use the values in the tables 1202 and 1204, together with the preference data 114 shown in a table 1300 shown in FIG. 13 (described below), to select one or more of the collaboration applications 602 for use with one or more particular individual(s) who are identified in an input 104 is described below in connection with FIGS. 9-11.

As shown in FIG. 7, at a decision step 702 of the routine 700, the status determination engine(s) 608 may determine whether at least one device operated by a particular individual is currently online with a multi-resource access system through which the individual may access the various collaboration applications 602. In implementations in which the collaboration management system 102 is included within, or operates in conjunction with, the multi-access resource system 500 described above in connection with FIGS. 5A-D, for example, the determination of the decision step 702 may be made by querying the single sign-on service 520 (or another component of the resource management services 502) to determine whether the individual has successfully signed on to the multi-resource access system 500.

When, at the decision step 702, the status determination engine(s) 608 determine that the individual is not online with the multi-resource access system, the routine 700 may proceed to a step 704, at which the status determination engine(s) 608 may set the "individual status" entry 1208 of the table 1202 (see FIG. 12A) to "unavailable." Thereafter, the routine 700 may terminate, as the remaining entries in the tables 1202 and 1204 relating to an "unavailable" individual are not used by the example implementation of the application selection engine 606 described below.

When, at the decision step 702, the status determination engine(s) 608 determine that the individual is online with the multi-resource access system, the routine 700 may proceed to a step 706, at which the status determination engine(s) 608 may set the "individual status" entry 1208 of the table 1202 (see FIG. 12A) for the individual being evaluated to "available."

At a step 708 of the routine 700, the status determination engine(s) 608 may determine the type of device the individual is using to access the multi-resource access system. In implementations in which the collaboration management system 102 is included within, or operates in conjunction with, the multi-access resource system 500 described above in connection with FIGS. 5A-D, for example, the determination of the decision step 708 may be made by querying the client interface service 514, the identity service 516, or another component of the resource management services 502, to determine the type of device individual is operating. In some implementations, for example, when individuals initially access the resources management services 502, and authenticate to the system via the identity service 516 (as discussed above in connection with FIG. 5B), the client interface service 514, the identity service 516, or another component of the resource management services 502 may record the device identifiers of the client device 108, 202 the individuals are operating. The collaboration management system 102 may further maintain records correlating device identifiers with device types, thus enabling the determination of the types of devices respective individuals are currently operating to access the multi-resource access system 500.

At the step 710 of the routine 700, the status determination engine(s) 608 may set the "user device type" entry 1208 of the table 1202 (see FIG. 12A) for the individual being evaluated to indicate the determined device type, e.g., "desktop," "laptop," or "mobile."

Per steps 712, 714, and 726, the status determination engine(s) 608 may identify and cycle through respective collaborations applications 602 of the individual for whom the status data 116 is being determined. In particular, the collaboration applications 602 identified at the step 712 may be selected, either one by one or in parallel, at the step 714, for evaluation by the subsequent steps 716, 718, 720, 722, and 724, until the status determination engine(s) 608 determine, at the decision step 726, that all of the identified applications have been evaluated. The identity of the collaboration applications 602 of a particular individual may be determined, for example, by referencing the table 1300 shown in FIG. 13, and identifying the "application" entries 1304 that are associated with the individual's user ID (per entry 1302). In some implementations, the particular collaboration applications 602 that are included among the entries 1304, as well as values for the remaining, preference-related entries 1306, 1308, 1310, 1312, 1314, and 1316 (described below), may be specified, for example, by the system administrator 622 and/or the user 106 via the collaboration application management engine 614 shown in FIG. 6.

As FIG. 7 shows, for collaboration applications 602 that are identified at the step 712, the status determination engine(s) 608 may determine, at the decision step 716, whether the application has an API that can be used to determine the status of the individual with respect to that application. In some implementations, for example, the status determination engine(s) 608 may maintain or have access to records that identify which collaborations have suitable APIs as well as the particular API methods that can be used to query such applications for status information. The determination at the decision step 716 may be made by referencing those records.

When, at the decision step 716, the status determination engine(s) 608 determine that the collaboration application 602 does have a suitable API, the routine 700 may proceed to a step 718, at which the status determination engine(s) 608 may request the authentication engine(s) 610 to retrieve the individual's access credentials for the collaboration application 602 from the database(s) 618. At a step 720 of the routine 700, the status determination engine(s) 608 may use the retrieved access credentials to query the collaboration application 602 for the individual's current status, e.g., via an API. The manner in which the status information returned from the queried collaboration application 602 may subsequently be processed, at a step 724, in accordance with some embodiments is described below in connection with FIG. 8.

When, at the decision step 716, the status determination engine(s) 608 determine that the collaboration application 602 does not have a suitable API, the routine 700 may instead proceed to a step 722, at which the status determination engine(s) 608 may query the resource feed management engine 620 for the current status of the collaboration application 602. As noted previously, the resource feed management engine 620 may, in some implementations, correspond to the resource feed service 518 shown in FIG. 5B. Accordingly, in at least some implementations, the resource feed management engine 620 may maintain records indicating which of the collaboration applications 602 are currently online with which individuals. The manner in which the status information obtained from the resource feed management engine 620 may subsequently be processed, at the step 724, in accordance with some embodiments is described below in connection with FIG. 8.

When, at the decision step 710, the status determination engine(s) 608 determine that all of the collaboration applications 602 identified at the step 712 have already been evaluated, the routine 700 may terminate. Otherwise, the routine 700 may return to the step 714, at which another one of the identified collaboration applications 602 may be selected for evaluation (per the steps 716, 718, 720, 722 and 724).

As noted above, FIG. 8 shows an example implementation of the step/routine 724 of the routine 700 shown in FIG. 7. In the illustrated example, the routine 724 shows how three potential status indications (i.e., "online," "away," and "meeting") can be processed by the status determination engine(s) 608 to set one or more of the entries 1208, 1212, and 1218 in the tables 1202 and 1204 shown in FIGS. 12A and 12B, respectively. It should be appreciated, however, that any of any of a number of additional or different status indications obtained from the collaborations applications 602 and/or the resource feed management engine 620, as discussed above, may be additionally or alternatively be evaluated in a similar fashion to determine the entries 1208, 1212 and/or 1218, or other entries that may be used by the application selection engine 606 to select one or more appropriate collaboration applications for use with individual(s) who are identified in an input 104.

As shown in FIG. 8, the routine 724 may begin at a decision step 802, at which the status determination engine(s) 608 may determine whether the acquired status information indicates the individual is online with the collaboration application 602 being evaluated. As shown, when the status determination engine(s) 608 determine that the individual is online with the collaboration application 602, the routine 724 may proceed to a step 804, at which the status determination engine(s) 608 may set the "application status" entry 1218 for the collaboration application 602 in the table 1204 (shown in FIG. 12B) for the individual being evaluated to "available." Otherwise, as indicated, the routine 724 may proceed to a step 806, at which the status determination engine(s) 608 may set the "application status" entry 1218 for the collaboration application 602 to "unavailable."

At a decision step 808 of the routine 724, the status determination engine(s) 608 may determine whether the acquired status information indicates the individual is "away," either for an indefinite period of time or for a particular period of time, e.g., two hours. For example, some applications may provide a status indicator specifying that the individual is currently either "present" or "away." As shown, when the status determination engine(s) 608 determine that the individual is away, the routine 724 may proceed to a step 810, at which the status determination engine(s) 608 may set the "individual status" entry 1208 in the table 1202 (shown in FIG. 12A) to "unavailable." Otherwise, as indicated, the routine 724 may proceed to a step 812, at which the status determination engine(s) 608 may set the "individual status" entry 1208 to "available." In some circumstances, an "away" status indication may also indicate that the user is online with the collaboration application 602, albeit away from the device used to access the application. Accordingly, in such a situation, the status determination engine(s) 608 may additionally set the "application status" entry 1218 for the collaboration application 602 in the table 1204 (shown in FIG. 12B) for the individual being evaluated to "available." As a practical matter, however, setting the "individual status" entry 1208 to "unavailable" may be all that is required since, as will be apparent from the description of FIGS. 9-11 below, an "unavailable" value for an "individual status" entry 1208 may render the remaining status data 116 associated with the indicated individual irrelevant with respect to the processing that is done by application selection engine 606.

At a decision step 814 of the routine 724, the status determination engine(s) 608 may determine whether the acquired status information indicates the individual is currently in a meeting. Such a "meeting" status may be determined, for example, based on a query to a collaboration application having a "calendar" feature, such as Microsoft Outlook. As shown, when the status determination engine(s) 608 determine that the individual is in a meeting, the routine 724 may proceed to a step 816, at which the status determination engine(s) 608 may set the "meeting flag" entry 1212 in the table 1202 (shown in FIG. 12A) for the individual being evaluated to "true." Otherwise, as indicated, the routine 724 may proceed to a step 818, at which the status determination engine(s) 608 may set the "meeting flag" entry 1212 to "false."

As noted above, in some embodiments, the example routine 900 shown in FIG. 9 may be executed by the application selection engine 606. A shown, the routine 900 may be begin at a step 902, at which the application selection engine 606 may receive an input 104 identifying one or more individuals with whom the user 106 desires to collaborate. As noted above, such an input 104 may, for example, be received via the user interface 604 shown in FIG. 6.

Per steps 904 and 916 of the routine 900, the application selection engine 606 may cycle through the individuals identified in the input 104 to determine one of three categories into which the respective individuals fall based on the status data 116. In particular, the individual(s) identified in the input 104 (which may include only a single individual) may be selected, either one by one or in parallel, at the step 904, for evaluation by the subsequent steps 906, 908, 910, 912, and 914, until the application selection engine 606 determines, at the decision step 916, that all of the identified individuals have been evaluated. If only one individual is identified in the input 104, then the steps 906, 908, 910, 912, and 914 need be executed only a single time. In some implementations, the application selection engine 606 may instruct the status determination engine(s) 608 to acquire current status data 116 for the individual(s) identified in the input 104, and to update the tables 1202 and 1204 (shown in FIGS. 12A and 12B) accordingly, in response to the input 104 being received by the application selection engine 606, per the step 902 of the routine 900. In other implementations, the status determination engine(s) 608 may acquire current status data 116 for all individuals who are registered with the system on a periodic basis or otherwise.

At a decision step 906 of the routine 900, the application selection engine 606 may determine whether the "individual status" entry 1208 (see table 1202 shown in FIG. 12A) for the individual selected at the step 904 is "available" or "unavailable."

When, at the decision step 906, the application selection engine 606 determines that the "individual status" entry 1208 for the individual selected at the step 904 is "unavailable," the routine 900 may proceed to a step 908, at which that individual's name may be added to an "unavailable list." Example uses for "unavailable list" that is so generated are described below in connection with a step 920.

When, at the decision step 906, the application selection engine 606 determines that the "individual status" entry 1208 for the individual selected at the step 904 is "available," the routine 900 may proceed to a decision step 910, at which the application selection engine 606 may determine whether the "meeting flag" entry 1212 (see table 1202 shown in FIG. 12A) for the individual selected at the step 904 is "true" or "false."

When, at the decision step 910, the application selection engine 606 determines that the "meeting flag" entry 1212 for the individual selected at the step 904 is "true," the routine 900 may proceed to a step 912, at which that individual's name may be added to a "meeting list." Example uses for "meeting list" that is so generated are described below in connection with a step/routine 924. An example implementation of the step/routine 924 is described below in connection with FIG. 10.

When, at the decision step 910, the application selection engine 606 determines that the "meeting flag" entry 1212 for the individual selected at the step 904 is "false," the routine 900 may proceed to a step 914, at which that individual's name may be added to a "non-meeting list." Example uses for "meeting list" that is so generated are described below in connection with a step/routine 928. An example implementation of the step/routine 928 is described below in connection with FIG. 11.

When, at the decision step 916, the application selection engine 606 determines that all of the individuals identified in the input 104 have been evaluated, the routine 900 may proceed to a decision step 918, at which the application selection engine 606 may determine whether any names were added to the "unavailable list" per the step 908. When, at the decision step 918, the application selection engine 606 determines that at least one name was added to the "unavailable list," the routine 900 may proceed to a step 920, at which the application selection engine 606 may cause the user interface 604 to prompt the user 106 to notify the individual(s) on the "unavailable list" that the user 106 desires to communicate with them. In some implementations, such a prompt may be structured to present a user interface element, e.g., a button, link, or the like, on the user interface 604, which can then be selected so as to automatically trigger a notification, e.g., an email, text message, etc., to be sent to the "unavailable" individual(s). In some implementations, such an email may similarly include a user interface element that can be selected by the individual who receives the notification so as to trigger the launching of a resource access application 522 on a client device 202 being operated by that individual, thus causing the "individual status" entry 1208 for that individual to change to "available."

At a decision step 922, the application selection engine 606 may determine whether any names were added to the "meeting list" per the step 912. When, at the decision step 922, the application selection engine 606 determines that at least one name was added to the "meeting list," the routine 900 may proceed to a step/routine 924, at which the application selection engine 606 may process the "meeting list" to select a collaboration application 602 for use in communicating with the indicated individual(s). An example implementation of the step/routine 924 is described below in connection with FIG. 10.

At a decision step 926, the application selection engine 606 may determine whether any names were added to the "non-meeting list" per the step 914. When, at the decision step 926, the application selection engine 606 determines that at least one name was added to the "non-meeting list," the routine 900 may proceed to a step/routine 928, at which the application selection engine 606 may process the "non-meeting list" to select a collaboration application 602 for use in communicating with the indicated individual(s). An example implementation of the step/routine 928 is described below in connection with FIG. 11.

As shown in FIG. 10, the step/routine 924 of the routine 900 (shown in FIG. 9) may begin at a step 1002, at which the application selection engine 606 may determine a list of the collaboration applications 602 that are accessible to individuals included on the "meeting list" created at the step 912 (shown in FIG. 9). The application selection engine 606 may generate such an "application list," for example, by referencing the table 1300 (shown in FIG. 13) to identify the collaboration applications 602 that have "application" entries 1304 for "user ID" entries 1302 of such individuals. The collaboration applications 602 of the individuals on the "meeting list" may be added to the "application list" that is generated at the step 1002.

Per steps 1004, 1006, 1018, and 1020, of the routine 924 (shown in FIG. 10), the application selection engine 606 may cycle through the applications on the "application list" determined at the step 1002 to evaluate "meeting" preference ranking values for individuals on the "meeting list" determined at the step 912. In particular, the collaboration applications 602 on the "application list" identified at the step 1002 may be selected, either one by one or in parallel, at the step 1004 for evaluation by the subsequent steps 1006, 1008, 1010, 1012, 1014, 1016, and 1018, until the application selection engine 606 determines, at the decision step 1020, that the identified collaboration applications 602 have been evaluated. Similarly, but as a nested loop, the individuals on the "meeting list" identified at the step 912 (see FIG. 9) may be selected, either one by one or in parallel, at the step 1006 for evaluation by the subsequent steps 1008, 1010, 1012, 1014, and 1016, until the application selection engine 606 determines, at the decision step 1018, that the identified individuals have been evaluated. As explained in more detail below, based on the evaluation performed at the steps 1008, 1010, 1012, 1014, and 1016, the application selection engine 606 may select a collaboration application 602 for use in communicating with the individual(s) on the "meeting list" from among the applications on the "application list" determined at the step 1002.

At the step 1008, the application selection engine 606 may determine the "device type" entry 1210 (see table 1202 shown in FIG. 12A) for the individual selected at the step 1006.

At the step 1010, the application selection engine 606 may determine the "meeting" preference ranking value for the collaboration application 602 selected at the step 1004, the individual selected at the step 1006, and the device type determined at the step 1008. With reference to the table 1300 shown in FIG. 13, for example, a "meeting" preference value 1318 for the "First App" and the individual with user ID "123," when that individual is using a "desktop" device, would be "3." Similarly, again with reference to the table 1300, the "meeting" preference value 1320 for the "Second App" and the individual with user ID "123," when that individual is using a "mobile" device, would be "1."

As noted above, in some implementations, a preference ranking value of "0" may indicate that the corresponding collaboration application 602 is not to be used in the indicated circumstance, e.g., when the individual is in a meeting. Thus, in such implementations, when the application selection engine 606 determines, at a decision step 1012, that the preference ranking value determined at the step 1010 is "0," the routine 924 may proceed to a step 1014, at which the application selection engine 606 may remove the collaboration application 602 having the preference ranking of "0" from the list that was determined at the step 1002. As indicated, the routine 924 may thereafter proceed to the decision step 1020, at which the application selection engine 606 may determine whether there are any remaining collaboration applications 602 on the "application list" determined at the step 1002 that have not yet been evaluated.

At the step 1016 of the routine 924, the "meeting" preference ranking value determined at the step 1010 may be added to a cumulative "meeting" ranking score for the collaboration application 602 that was selected at the step 1004. In some implementations, a respective cumulative "meeting" ranking score may be determined for individual collaboration applications 602 of the "application list" determined at the step 1002 (less any applications removed from that list per the step 1014). Such cumulative "meeting" ranking scores may be reset to "0" before the evaluation by the nested loops 1004, 1006, 1016, 1018 begins. Accordingly, following execution of the nested loops 1004, 1006, 1016, 1018, the cumulative "meeting" raking scores may represent, for each application on the "application list"

determined at the step 1002, the sum of the "meeting" preference values (determined at the step 1010) for all of the individuals on the "meeting list" determined at the step 912 (see FIG. 9).

At a step 1022 of the routine 924, the application selection engine 606 may select the collaboration application 602 on the "application list" (determined at the step 1002) that has the lowest cumulative "meeting" ranking score (determined at the step 1016—within the nested loops 1004, 1006, 1016, 1018) as the collaboration application 602 that is to be used for collaborating with the individuals on the "meeting list" determined at the step 912 (see FIG. 9). Additionally or alternatively, one or more collaboration applications 602 that have a cumulative "meeting" ranking score that is below a threshold value may be identified for possible selection by the user 106.

At a step 1024 of the routine 924, the application selection engine 606 may cause the user interface 604 to prompt the user 106 to initiate a collaboration session with the individual(s) on the "meeting list" determined at the step 912 using the selected collaboration application 602. In some implementations, such a prompt may be structured to present a user interface element, e.g., a button, link, or the like, on the user interface 604, which can then be selected so as to cause the application launch engine 612 to initiate a collaboration session with the indicated individual(s) using the selected collaboration application 602. As noted above, in some implementations, the application launch engine 612 may obtain the access credentials for such individual(s) from the database(s) 618 (e.g., via the authentication engine(s) 610) to enable launch and/or use of the selected collaboration application 602.

In some implementations, the application launch engine 612 may launch the selected collaboration application 602 by calling one or more API methods for the application. For example, if the selected collaboration application 602 is Slack, the application launch engine 612 may create a conversation using the Uniform Resource Locator (URL) "api.slack.com" at the path "methods/im.open," and may create a return channel identifier to Post a message at the path "methods/chat.postMessage" of that same URL.

In the example implementation of the step/routine 924 described above in connection with FIG. 10, the "application list" is generated (at the step 1002) so as to include only applications 602 that are currently accessible to all of the individuals on the "meeting list" created at the step 912 (shown in FIG. 9). In other implementations, however, the application selection engine 606 may instead include on the "application list" generated at the step 1002 any application 602 that is accessible to at least one individual on the "meeting list" created at the step 912. In such an implementation, when, at the step 1022, the application selection engine 606 selects an application 602 that is not currently accessible to one or more of the individuals on the "meeting list," the application selection engine 606 may invite such individual(s) to install the selected application 602 so as to be able to collaborate with the user 106. Because, in such an implementation, it is possible that the table 1300 (shown in FIG. 13) will not include preference ranking values for applications that are not currently accessible to particular individuals, the application selection engine 606 may, at the step 1010, use a default "meeting" preference value that is relatively high, e.g., "5," for such applications/individuals, so as to minimize the circumstances in which individuals need to install new applications 602.

As shown in FIG. 11, the step/routine 928 of the routine 900 (shown in FIG. 9) may begin at a step 1102, at which the application selection engine 606 may determine a list of the collaboration applications 602 that are accessible to the individuals included on the "non-meeting list" created at the step 914 (shown in FIG. 9). The application selection engine 606 may generate such an "application list," for example, by referencing the table 1300 (shown in FIG. 13) to identify the collaboration applications 602 that have "application" entries 1304 for "user ID" entries 1302 of such individuals. The collaboration applications 602 of the individuals on the "non-meeting list" may be added to the "application list" that is generated at the step 1102.

Per steps 1104, 1106, 1118, and 1120, of the routine 928 (shown in FIG. 11), the application selection engine 606 may cycle through the collaboration applications 602 on the "application list" determined at the step 1102 to evaluate "meeting" preference ranking values for the individuals on the "non-meeting list" determined at the step 914. In particular, the collaboration applications 602 on the "application list" identified at the step 1102 may be selected, either one by one or in parallel, at the step 1104 for evaluation by the subsequent steps 1106, 1108, 1110, 1112, 1114, 1116, and 1118, until the application selection engine 606 determines, at the decision step 1120, that the identified collaboration applications 602 have been evaluated. Similarly, but as a nested loop, the individuals on the "non-meeting list" identified at the step 914 (see FIG. 9) may be selected, either one by one or in parallel, at the step 1106 for evaluation by the subsequent steps 1108, 1110, 1112, 1114, and 1116, until the application selection engine 606 determines, at the decision step 1118, that the identified individuals have been evaluated. As explained in more detail below, based on the evaluation performed at the steps 1108, 1110, 1112, 1114, and 1116, the application selection engine 606 may select a collaboration application 602 for use in communicating with the individuals on the "non-meeting list" from among the applications on the "application list" determined at the step 1102.

At the step 1108, the application selection engine 606 may determine the "device type" entry 1210 (see table 1202 shown in FIG. 12A) for the individual selected at the step 1106.

At the step 1110, the application selection engine 606 may determine the "non-meeting" preference ranking value of the collaboration application 602 selected at the step 1104, the individual selected at the step 1106, and the device type determined at the step 1108. With reference to the table 1300 shown in FIG. 13, for example, a "non-meeting" preference value 1322 for the "Third App" and the individual with user ID "123," when that individual is using a "laptop" device, would be "4." Similarly, again with reference to the table 1300, the "non-meeting" preference value 1324 for the "Fourth App" and the individual with user ID "123," when that individual is using a "mobile" device, would be "0."

As noted above, in some implementations, a preference ranking value of "0" may indicate that the corresponding collaboration application 602 is not to be used in the indicated circumstance, e.g., when the individual is using a mobile device. Thus, in such implementations, when the application selection engine 606 determines, at a decision step 1112, that the preference ranking value determined at the step 1110 is "0," the routine 928 may proceed to a step 1114, at which the application selection engine 606 may remove the collaboration application 602 having the preference ranking of "0" from the list that was determined at the step 1102. As indicated, the routine 928 may thereafter proceed to the decision step 1120, at which the application selection engine 606 may determine whether there are any remaining collaboration applications 602 on the "application list" determined at the step 1102 that have not yet been evaluated.

At the step 1116 of the routine 928, the "non-meeting" preference ranking value determined at the step 1110 may be added to a cumulative "non-meeting" ranking score for the collaboration application 602 that was selected at the step 1104. In some implementations, a respective cumulative "non-meeting" ranking score may be determined for individual collaboration applications 602 of the "application list" determined at the step 1102 (less any applications removed from that list per the step 1114). Such cumulative "non-meeting" ranking scores may be reset to "0" before the evaluation by the nested loops 1104, 1106, 1116, 1118 begins. Accordingly, following execution of the nested loops 1104, 1106, 1116, 1118, the cumulative "non-meeting" raking scores may represent, for individual applications on the "application list" determined at the step 1102, the sum of the "non-meeting" preference values (determined at the step 1110) for the individuals on the "non-meeting list" determined at the step 914 (see FIG. 9).

At a step 1122 of the routine 928, the application selection engine 606 may select the collaboration application 602 on the "application list" determined at the step 1102 that has the lowest cumulative "non-meeting" ranking score (determined at the step 1116—within the nested loops 1004, 1006, 1016, 1018) as the collaboration application 602 that is to be used for collaborating with the individuals on the "non-meeting list" determined at the step 914 (see FIG. 9). Additionally or alternatively, one or more collaboration applications 602 that have a cumulative "non-meeting" ranking score that is below a threshold value may be identified for possible selection by the user 106.

At a step 1124 of the routine 928, the application selection engine 606 may cause the user interface 604 to prompt the user 106 to initiate a collaboration session with the individual(s) on the "non-meeting list" determined at the step 914 (see FIG. 9) using the selected collaboration application 602. In some implementations, such a prompt may be structured to present a user interface element, e.g., a button, link, or the like, on the user interface 604, which can then be selected so as to cause the application launch engine 612 to initiate a collaboration session with the indicated individual(s) using the selected collaboration application 602. As noted above, in some implementations, the application launch engine 612 may obtain the access credentials for such individual(s) from the database(s) 618 (e.g., via the authentication engine(s) 610) to enable launch and/or use of the selected collaboration application 602.

In some implementations, the application launch engine 612 may launch the selected collaboration application 602 by calling one or more API methods for the application. For example, if the selected collaboration application 602 is Slack, the application launch engine 612 may create a conversation using the Uniform Resource Locator (URL) "api.slack.com" at the path "methods/im.open," and may create a return channel identifier to Post a message at the path "methods/chat.postMessage" of that same URL.

In the example implementation of the step/routine 928 described above in connection with FIG. 11, the "application list" is generated (at the step 1102) so as to include only applications 602 that are currently accessible to all of the individuals on the "non-meeting list" created at the step 914 (shown in FIG. 9). In other implementations, however, the application selection engine 606 may instead include on the "application list" generated at the step 1102 any application 602 that is accessible to at least one individual on the "non-meeting list" created at the step 914. In such an implementation, when, at the step 1122, the application selection engine 606 selects an application 602 that is not currently accessible to one or more of the individuals on the "non-meeting list," the application selection engine 606 may invite such individual(s) to install the selected application 602 so as to be able to collaborate with the user 106. Because, in such an implementation, it is possible that the table 1300 (shown in FIG. 13) will not include preference ranking values for applications that are not currently accessible to particular individuals, the application selection engine 606 may, at the step 1110, use a default "non-meeting" preference value that is relatively high, e.g., "5," for such applications/individuals, so as to minimize the circumstances in which individuals need to install new applications 602.

G. Example Implementations of Methods, Systems, and Computer-Readable Media in Accordance with the Present Disclosure The following paragraphs (M1) through (M17) describe examples of methods that may be implemented in accordance with the present disclosure.

(M1) A method may be performed that involves receiving, by a computing system, a first input indicative of a first individual with whom a user of a client device is to communicate; determining, by the computing system, first data of a first plurality of applications, the first data being indicative of the first individual being available with at least one of the first plurality of applications; selecting, by the computing system and based at least in part on the first data, a first application, from among the first plurality of applications, for communication with the first individual; and causing the client device to output an indication that the first application can be used to communicate with the first individual (M2) A method may be performed as described in paragraph (M1), and may further involve determining, by the computing system, that the first data indicates the first individual is available with the first application and a second application; and determining, by the computing system, second data indicating that the first individual prefers the first application over the second application; wherein selecting the first application may further be based at least in part on the second data.

(M3) A method may be performed as described in paragraph (M2), wherein the first data may indicate that the first individual is in a meeting; and the second data may indicate that the first individual prefers the first application over the second application when the first individual is in a meeting.

(M4) A method may be performed as described in paragraph (M2), wherein the first data may indicate that the first individual is not in a meeting; and the second data may indicate the first individual prefers the first application over the second application when the first individual is not in a meeting.

(M5) A method may be performed as described in any of paragraphs (M2) through (M4), and may further involve storing the first data in association with the second data.

(M5) A method may be performed as described in any of paragraphs (M1) through (M5), and may further involve retrieving first access credentials of the first individual from at least one storage medium; using the first access credentials to request a first portion of the first data from the first application; retrieving second access credentials of the first individual from the at least one storage medium; and using the second access credentials to request a second portion of the first data from a second collaboration application.

(M7) A method may be performed as described in any of paragraphs (M1) through (M6), and may further involve determining, by the computing system, second data of a second plurality of applications, the second data being indicative of a second individual being available with at least the first application; and causing the client device to output an indication that the first application can be used to communicate with the second individual; wherein the first input may further be indicative of the second individual, and selecting the first application may further be based at least on part on the second data.

(M8) A method may be performed as described in any of paragraphs (M1) through (M7), and wherein the first input may further be indicative of a second individual, and the method may further involve determining, by the computing system, second data of a second plurality of applications, the second data being indicative of the second individual being available with at least one of the second plurality of applications; determining, by the computing system, that the second data further indicates the second individual is in a meeting; determining, by the computing system, third data indicating that the second individual prefers a second application, included among the second plurality of applications, over the first application when the second individual is in a meeting; selecting, by the computing system and based at least in part on the second data and the third data, the second application for communication with the second individual; and causing the client device to output an indication that the second application can be used to communicate with the second individual.

(M9) A method may be performed as described in any of paragraphs (M1) through (M8), and may further involve causing the client device to display at least one user interface element that is selectable to cause the computing system to enable communication with the first individual using the first application.

(M10) A method may be performed as described in any of paragraphs (M1) through (M9), and may further involve receiving, by the computing system, a second input confirming that the first application is to be used to communicate with the first individual; and enabling, in response to the second input, communication with the first individual using the first application.

(M11) A method may be performed that involves receiving, by a computing system, a first input indicative of a first individual with whom a user of a client device is to communicate; determining, by the computing system, first data indicating that the first individual prefers a first application over a second application; selecting, by the computing system and based at least in part on the first data, the first application for communication with the first individual; and causing the client device to output an indication that the first application can be used to communicate with the first individual.

(M12) A method may be performed as described in paragraph (M11), and may further involve determining second data indicating that the first individual is in a meeting; wherein the first data may indicate the first individual prefers the first application over the second application when the first individual is in a meeting, and selecting the first application may further be based at least in part on the second data.

(M13) A method may be performed as described in paragraph (M12), and the second data may further indicate that the first individual prefers a third application over the first application when the first individual is not in a meeting.

(M14) A method may be performed as described in any of paragraphs (M11) through (M13), and may further involve determining second data indicating that the first individual is not in a meeting; wherein the first data may indicate that the first individual prefers the first application over the second application when the first individual is not in a meeting, and selecting the first application may further be based at least in part on the second data.

(M15) A method may be performed as described in any of paragraphs (M11) through (M14), wherein the first input may further be indicative of a second individual, and the method may further involve determining, by the computing system, second data indicating that the second individual prefers the first application over the second application; wherein selecting the first application may further be based at least in part on the second data.

(M16) A method may be performed as described in any of paragraphs (M11) through (M15), and may further involve causing the client device to display at least one user interface element that is selectable to cause the computing system to enable communication with the first individual using the first application.

(M17) A method may be performed as described in any of paragraphs (M11) through (M16), and may further involve receiving, by the computing system, a second input confirming that the first application is to be used to communicate with the first individual; and enabling, in response to the second input, communication with the first individual using the first application.

The following paragraphs (S1) through (S17) describe examples of systems and/or apparatuses that may be implemented in accordance with the present disclosure.

(S1) A computing system may include at least one processor and at least one computer-readable medium encoded with instructions which, when executed by the at least one processor, cause the computing system to receive a first input indicative of a first individual with whom a user of a client device is to communicate; to determine first data of a first plurality of applications, the first data being indicative of the first individual being available with at least one of the first plurality of applications; to select, based at least in part on the first data, a first application, from among the first plurality of applications, for communication with the first individual; and to cause the client device to output an indication that the first application can be used to communicate with the first individual.

(S2) A computing system may be configured as described in paragraph (S1), and the least one computer-readable medium may be further encoded with additional instructions which, when executed by the at least one processor, further cause the computing system to determine that the first data indicates the first individual is available with the first application and a second application; and to determine second data indicating that the first individual prefers the first application over the second application; wherein the first application may further be selected based at least in part on the second data.

(S3) A computing system may be configured as described in paragraph (S2), wherein the first data may indicate that the first individual is in a meeting; and the second data may indicate that the first individual prefers the first application over the second application when the first individual is in a meeting.

(S4) A computing system may be configured as described in paragraph (S2), wherein the first data may indicate that the first individual is not in a meeting; and the second data may indicate the first individual prefers the first application over the second application when the first individual is not in a meeting.

(S5) A computing system may be configured as described in any of paragraphs (S2) through (S4), and the least one computer-readable medium may be further encoded with additional instructions which, when executed by the at least one processor, further cause the computing system to store the first data in association with the second data.

(S5) A computing system may be configured as described in any of paragraphs (S1) through (S5), and the least one computer-readable medium may be further encoded with additional instructions which, when executed by the at least one processor, further cause the computing system to retrieve first access credentials of the first individual from at least one storage medium; to use the first access credentials to request a first portion of the first data from the first application; to retrieve second access credentials of the first individual from the at least one storage medium; and to use the second access credentials to request a second portion of the first data from a second collaboration application.

(S7) A computing system may be configured as described in any of paragraphs (S1) through (S6), and the least one computer-readable medium may be further encoded with additional instructions which, when executed by the at least one processor, further cause the computing system to determine second data of a second plurality of applications, the second data being indicative of a second individual being available with at least the first application; and to cause the client device to output an indication that the first application can be used to communicate with the second individual; wherein the first input may further be indicative of the second individual, and the first application may further be selected based at least on part on the second data.

(S8) A computing system may be configured as described in any of paragraphs (S1) through (S7), and wherein the first input may further be indicative of a second individual, and the least one computer-readable medium may be further encoded with additional instructions which, when executed by the at least one processor, further cause the computing system to determine second data of a second plurality of applications, the second data being indicative of the second individual being available with at least one of the second plurality of applications; to determine that the second data further indicates the second individual is in a meeting; to determine third data indicating that the second individual prefers a second application, included among the second plurality of applications, over the first application when the second individual is in a meeting; to select, based at least in part on the second data and the third data, the second application for communication with the second individual; and to cause the client device to output an indication that the second application can be used to communicate with the second individual.

(S9) A computing system may be configured as described in any of paragraphs (S1) through (S8), and the least one computer-readable medium may be further encoded with additional instructions which, when executed by the at least one processor, further cause the computing system to cause the client device to display at least one user interface element that is selectable to cause the computing system to enable communication with the first individual using the first application.

(S10) A computing system may be configured as described in any of paragraphs (S1) through (S9), and the least one computer-readable medium may be further encoded with additional instructions which, when executed by the at least one processor, further cause the computing system to receive a second input confirming that the first application is to be used to communicate with the first individual; and to enable, in response to the second input, communication with the first individual using the first application.

(S11) A computing system may include at least one processor and at least one computer-readable medium encoded with instructions which, when executed by the at least one processor, cause the computing system to receive a first input indicative of a first individual with whom a user of a client device is to communicate; to determine first data indicating that the first individual prefers a first application over a second application; to select, based at least in part on the first data, the first application for communication with the first individual; and to cause the client device to output an indication that the first application can be used to communicate with the first individual.

(S12) A computing system may be configured as described in paragraph (S11), and the least one computer-readable medium may be further encoded with additional instructions which, when executed by the at least one processor, further cause the computing system to determine second data indicating that the first individual is in a meeting; wherein the first data may indicate the first individual prefers the first application over the second application when the first individual is in a meeting, and the first application may further be selected based at least in part on the second data.

(S13) A computing system may be configured as described in paragraph (S12), wherein the second data may further indicate that the first individual prefers a third application over the first application when the first individual is not in a meeting.

(S14) A computing system may be configured as described in any of paragraphs (S11) through (S13), and the least one computer-readable medium may be further encoded with additional instructions which, when executed by the at least one processor, further cause the computing system to determine second data indicating that the first individual is not in a meeting; wherein the first data may indicate that the first individual prefers the first application over the second application when the first individual is not in a meeting, and the first application may further be selected based at least in part on the second data.

(S15) A computing system may be configured as described in any of paragraphs (S11) through (S14), wherein the first input may further be indicative of a second individual, and the least one computer-readable medium may be further encoded with additional instructions which, when executed by the at least one processor, further cause the computing system to determine second data indicating that the second individual prefers the first application over the second application; wherein the first application may further be selected based at least in part on the second data.

(S16) A computing system may be configured as described in any of paragraphs (S11) through (S15), and the least one computer-readable medium may be further encoded with additional instructions which, when executed by the at least one processor, further cause the computing system to cause the client device to display at least one user interface element that is selectable to cause the computing system to enable communication with the first individual using the first application.

(S17) A computing system may be configured as described in any of paragraphs (S11) through (S16), and the least one computer-readable medium may be further encoded with additional instructions which, when executed by the at least one processor, further cause the computing system to receive a second input confirming that the first application is to be used to communicate with the first individual; and to enable, in response to the second input, communication with the first individual using the first application.

The following paragraphs (CRM1) through (CRM17) describe examples of computer-readable media that may be implemented in accordance with the present disclosure.

(CRM1) At least one non-transitory computer-readable medium may be encoded with instructions which, when executed by the at least one processor of a computing system, cause the computing system to receive a first input indicative of a first individual with whom a user of a client device is to communicate; to determine first data of a first plurality of applications, the first data being indicative of the first individual being available with at least one of the first plurality of applications; to select, based at least in part on the first data, a first application, from among the first plurality of applications, for communication with the first individual; and to cause the client device to output an indication that the first application can be used to communicate with the first individual (CRM2) At least one non-transitory computer-readable medium may be configured as described in paragraph (CRM1), and may be further encoded with additional instructions which, when executed by the at least one processor, further cause the computing system to determine that the first data indicates the first individual is available with the first application and a second application; and to determine second data indicating that the first individual prefers the first application over the second application; wherein the first application may further be selected based at least in part on the second data.

(CRM3) At least one non-transitory computer-readable medium may be configured as described in paragraph (CRM2), wherein the first data may indicate that the first individual is in a meeting; and the second data may indicate that the first individual prefers the first application over the second application when the first individual is in a meeting.

(CRM4) At least one non-transitory computer-readable medium may be configured as described in paragraph (CRM2), wherein the first data may indicate that the first individual is not in a meeting; and the second data may indicate the first individual prefers the first application over the second application when the first individual is not in a meeting.

(CRM5) At least one non-transitory computer-readable medium may be configured as described in any of paragraphs (CRM2) through (CRM4), and may be further encoded with additional instructions which, when executed by the at least one processor, further cause the computing system to store the first data in association with the second data.

(CRM5) At least one non-transitory computer-readable medium may be configured as described in any of paragraphs (CRM1) through (CRM5), and may be further encoded with additional instructions which, when executed by the at least one processor, further cause the computing system to retrieve first access credentials of the first individual from at least one storage medium; to use the first access credentials to request a first portion of the first data from the first application; to retrieve second access credentials of the first individual from the at least one storage medium; and to use the second access credentials to request a second portion of the first data from a second collaboration application.

(CRM7) At least one non-transitory computer-readable medium may be configured as described in any of paragraphs (CRM1) through (CRM6), and may be further encoded with additional instructions which, when executed by the at least one processor, further cause the computing system to determine second data of a second plurality of applications, the second data being indicative of a second individual being available with at least the first application; and to cause the client device to output an indication that the first application can be used to communicate with the second individual; wherein the first input may further be indicative of the second individual, and the first application may further be selected based at least on part on the second data.

(CRM8) At least one non-transitory computer-readable medium may be configured as described in any of paragraphs (CRM1) through (CRM7), wherein the first input may further be indicative of a second individual, and the least one computer-readable medium may be further encoded with additional instructions which, when executed by the at least one processor, further cause the computing system to determine second data of a second plurality of applications, the second data being indicative of the second individual being available with at least one of the second plurality of applications; to determine that the second data further indicates the second individual is in a meeting; to determine third data indicating that the second individual prefers a second application, included among the second plurality of applications, over the first application when the second individual is in a meeting; to select, based at least in part on the second data and the third data, the second application for communication with the second individual; and to cause the client device to output an indication that the second application can be used to communicate with the second individual.

(CRM9) At least one non-transitory computer-readable medium may be configured as described in any of paragraphs (CRM1) through (CRM8), and may be further encoded with additional instructions which, when executed by the at least one processor, further cause the computing system to cause the client device to display at least one user interface element that is selectable to cause the computing system to enable communication with the first individual using the first application.

(CRM10) At least one non-transitory computer-readable medium may be configured as described in any of paragraphs (CRM1) through (CRM9), and may be further encoded with additional instructions which, when executed by the at least one processor, further cause the computing system to receive a second input confirming that the first application is to be used to communicate with the first individual; and to enable, in response to the second input, communication with the first individual using the first application.

(CRM11) At least one non-transitory computer-readable medium may be encoded with instructions which, when executed by the at least one processor of a computing system, cause the computing system to receive a first input indicative of a first individual with whom a user of a client device is to communicate; to determine first data indicating that the first individual prefers a first application over a second application; to select, based at least in part on the first data, the first application for communication with the first individual; and to cause the client device to output an indication that the first application can be used to communicate with the first individual.

(CRM12) At least one non-transitory computer-readable medium may be configured as described in paragraph (CRM11), and the may be further encoded with additional instructions which, when executed by the at least one processor, further cause the computing system to determine second data indicating that the first individual is in a meeting; wherein the first data may indicate the first individual prefers the first application over the second application when the first individual is in a meeting, and the first application may further be selected based at least in part on the second data.

(CRM13) At least one non-transitory computer-readable medium may be configured as described in paragraph (CRM12), wherein the second data may further indicate that the first individual prefers a third application over the first application when the first individual is not in a meeting.

(CRM14) At least one non-transitory computer-readable medium may be configured as described in any of paragraphs (CRM11) through (CRM13), and may be further encoded with additional instructions which, when executed by the at least one processor, further cause the computing system to determine second data indicating that the first individual is not in a meeting; wherein the first data may indicate that the first individual prefers the first application over the second application when the first individual is not in a meeting, and the first application may further be selected based at least in part on the second data.

(CRM15) At least one non-transitory computer-readable medium may be configured as described in any of paragraphs (CRM11) through (CRM14), wherein the first input may further be indicative of a second individual, and the least one computer-readable medium may be further encoded with additional instructions which, when executed by the at least one processor, further cause the computing system to determine second data indicating that the second individual prefers the first application over the second application; wherein the first application may further be selected based at least in part on the second data.

(CRM16) At least one non-transitory computer-readable medium may be configured as described in any of paragraphs (CRM11) through (CRM15), and may be further encoded with additional instructions which, when executed by the at least one processor, further cause the computing system to cause the client device to display at least one user interface element that is selectable to cause the computing system to enable communication with the first individual using the first application.

(CRM17) At least one non-transitory computer-readable medium may be configured as described in any of paragraphs (CRM11) through (CRM16), and may be further encoded with additional instructions which, when executed by the at least one processor, further cause the computing system to receive a second input confirming that the first application is to be used to communicate with the first individual; and to enable, in response to the second input, communication with the first individual using the first application.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   receiving, by a computing system, a first input provided to a user interface of a client device, the first input being indicative of a first individual;
   determining, by the computing system, first data and second data, the first data indicating that first and second collaboration applications of a first plurality of computer-implemented collaboration applications are available for use by the first individual, and the second data indicating a preference of the first individual for use of the first collaboration application over the second collaboration application;
   selecting, by the computing system and based at least in part on the first input, the first data, and the second data, the first collaboration application, from among the first plurality of computer-implemented collaboration applications, for communication with the first individual;
   causing, based at least in part on the selection of the first collaboration application, the user interface of the client device to display a first user interface element that is selectable to cause the computing system to enable electronic communication with the first individual using the first collaboration application rather than the second collaboration application;
   receiving, by the computing system, a second input indicative of selection of the first user interface element; and
   in response to the second input, enabling the electronic communication with the first individual using the first collaboration application.

2. The method of claim 1, wherein:
   the first data further indicates that the first individual is in a meeting; and the second data further indicates a preference of the first individual for use of the first collaboration application over the second collaboration application for occasions on which the first individual is in a meeting.

3. The method of claim 1, wherein:
the first data further indicates that the first individual is not in a meeting; and
the second data further indicates a preference of the first individual for use of the first collaboration application over the second collaboration application for occasions on which the first individual is not in a meeting.

4. The method of claim 1, further comprising:
storing the first data in association with the second data.

5. The method of claim 1, further comprising:
determining, by the computing system, third data of a second plurality of computer-implemented collaboration applications, the third data indicating that at least the first collaboration application is available for use by a second individual; wherein:
the first input is further indicative of the second individual,
selecting the first collaboration application is further based at least on part on the third data, and
selection of the first user interface element further causes the computing system to enable electronic communication with the second individual using the first collaboration application.

6. The method of claim 1, wherein the first input is further indicative of a second individual, and the method further comprises:
determining, by the computing system, third data of a second plurality of computer-implemented collaboration applications, the third data indicating that at least one of the second plurality of computer-implemented collaboration applications is available for use by the second individual;
determining, by the computing system, that the third data further indicates the second individual is in a meeting;
determining, by the computing system, fourth data indicating a preference of the second individual for use of a third collaboration application, included among the second plurality of computer-implemented collaboration applications, over the first collaboration application for occasions on which the second individual is in a meeting;
selecting, by the computing system and based at least in part on the first input, the third data and the fourth data, the third collaboration application, from among the second plurality of computer-implemented collaboration applications, for communication with the second individual; and
causing the client device to display a second user interface element that is selectable to cause the computing system to enable electronic communication with the second individual using the third collaboration application.

7. A method, comprising:
receiving, by a computing system, a first input provided to a user interface of a client device, the first input being indicative of a first individual;
determining, by the computing system, first data of a first plurality of computer-implemented collaboration applications, the first data indicating that at least one of the first plurality of computer-implemented collaboration applications is available for use by the first individual, wherein determining the first data comprises:
retrieving first access credentials associated with the first individual from at least one storage medium,
using the first access credentials to request a first portion of the first data from a first collaboration application,
retrieving second access credentials associated with the first individual from the at least one storage medium, and
using the second access credentials to request a second portion of the first data from a second collaboration application;
selecting, by the computing system and based at least in part on the first input and the first data, the first collaboration application, from among the first plurality of computer-implemented collaboration applications, for communication with the first individual;
causing, based at least in part on the selection of the first collaboration application, the user interface of the client device to display a first user interface element that is selectable to cause the computing system to enable electronic communication with the first individual using the first collaboration application;
receiving, by the computing system, a second input indicative of selection of the first user interface element; and
in response to the second input, enabling the electronic communication with the first individual using the first collaboration application.

8. The method of claim 7, further comprising:
determining, by the computing system, second data of a second plurality of computer-implemented collaboration applications, the second data indicating that at least the first collaboration application is available for use by a second individual;
wherein:
the first input is further indicative of the second individual,
selecting the first collaboration application is further based at least on part on the second data, and
selection of the first user interface element further causes the computing system to enable electronic communication with the second individual using the first collaboration application.

9. The method of claim 7, wherein the first input is further indicative of a second individual, and the method further comprises:
determining, by the computing system, second data of a second plurality of computer-implemented collaboration applications, the second data indicating that at least one of the second plurality of computer-implemented collaboration applications is available for use by the second individual;
determining, by the computing system, that the second data further indicates the second individual is in a meeting;
determining, by the computing system, third data indicating a preference of the second individual for use of a third collaboration application, included among the second plurality of computer-implemented collaboration applications, over the first collaboration application for occasions on which the second individual is in a meeting;
selecting, by the computing system and based at least in part on the first input, the second data and the third data, the third collaboration application, from among the second plurality of computer-implemented collaboration applications, for communication with the second individual; and causing the client device to display a second user interface element that is selectable to cause the computing system to enable electronic communication with the second individual using the second third collaboration application.

10. A computing system, comprising:
at least one processor; and
at least one computer-readable medium encoded with instructions which, when executed by the at least one processor, cause the computing system to:
receive a first input provided to a user interface of a client device, the first input being indicative of a first individual,
determine first data and second data, the first data indicating that first and second collaboration applications of a plurality of computer-implemented collaboration applications are available for use by the first individual, and the second data indicating a preference of the first individual for use of the first collaboration application over the second collaboration application,
select, based at least in part on the first input, the first data, and the second data, the first collaboration application, from among the plurality of computer-implemented collaboration applications, for communication with the first individual,
cause, based at least in part on the selection of the first collaboration application, the user interface of the client device to display a user interface element that is selectable to cause the computing system to enable electronic communication with the first individual using the first collaboration application rather than the second collaboration application,
receive a second input indicative of selection of the user interface element, and
in response to the second input, enable the electronic communication with the first individual using the first collaboration application.

11. The computing system of claim 10, wherein:
the first data further indicates that the first individual is in a meeting; and
the second data further indicates a preference of the first individual for use of the first collaboration application over the second collaboration application for occasions on which the first individual is in a meeting.

12. The computing system of claim 10, wherein:
the first data further indicates that the first individual is not in a meeting; and
the second data further indicates a preference of the first individual for use of the first collaboration application over the second collaboration application for occasions on which the first individual is not in a meeting.

13. The computing system of claim 10, wherein the at least one computer-readable medium is further encoded with additional instructions which, when executed by the at least one processor, further cause the computing system to:
store the first data in association with the second data.

14. A computing system, comprising:
at least one processor; and
at least one computer-readable medium encoded with instructions which, when executed by the at least one processor, cause the computing system to:
receive a first input provided to a user interface of a client device, the first input being indicative of a first individual;
determine first data of a first plurality of computer-implemented collaboration applications, the first data indicating that at least one of the first plurality of computer-implemented collaboration applications is available for use by the first individual, wherein determining the first data comprises:
retrieving first access credentials associated with the first individual from at least one storage medium,
using the first access credentials to request a first portion of the first data from a first collaboration application,
retrieving second access credentials associated with the first individual from the at least one storage medium, and
using the second access credentials to request a second portion of the first data from a second collaboration application;
select, based at least in part on the first input and the first data, the first collaboration application, from among the first plurality of computer-implemented collaboration applications, for communication with the first individual;
cause, based at least in part on the selection of the first collaboration application, the user interface of the client device to display a first user interface element that is selectable to cause the computing system to enable electronic communication with the first individual using the first collaboration application;
receive a second input indicative of selection of the first user interface element; and
in response to the second input, enable the electronic communication with the first individual using the first collaboration application.

15. The computing system of claim 14, wherein the at least one computer-readable medium is further encoded with additional instructions which, when executed by the at least one processor, further cause the computing system to:
determine second data of a second plurality of computer-implemented collaboration applications, the second data indicating that at least the first collaboration application is available for use by a second individual;
wherein:
the first input is further indicative of the second individual,
selecting the first collaboration application is further based at least on part on the second data, and
selection of the first user interface element further causes the computing system to enable electronic communication with the second individual using the first collaboration application.

16. The computing system of claim 14, wherein the first input is further indicative of a second individual, and the at least one computer-readable medium is further encoded with additional instructions which, when executed by the at least one processor, further cause the computing system to:
determine second data of a second plurality of computer-implemented collaboration applications, the second data indicating that at least one of the second plurality of computer-implemented collaboration applications is available for use by the second individual;
determine that the second data further indicates the second individual is in a meeting;
determine third data indicating a preference of the second individual for use of a third collaboration application, included among the second plurality of computer-implemented collaboration applications, over the first collaboration application for occasions on which the second individual is in a meeting;

select, based at least in part on the first input, the second data and the third data, the third collaboration application, from among the second plurality of computer-implemented collaboration applications, for communication with the second individual; and cause the client device to display a second user interface element that is selectable to cause the computing system to enable electronic communication with the second individual using the second collaboration application.

* * * * *